(12) United States Patent
Knoppert

(10) Patent No.: US 11,099,605 B2
(45) Date of Patent: Aug. 24, 2021

(54) CHARGER STAND FOR MULTI-FORM FACTOR INFORMATION HANDLING SYSTEMS (IHSS)

(71) Applicant: Dell Products, L.P., Round Rock, TX (US)

(72) Inventor: Michiel Sebastiaan Emanuel Petrus Knoppert, Amsterdam (NL)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/374,580

(22) Filed: Apr. 3, 2019

(65) Prior Publication Data
US 2020/0319674 A1 Oct. 8, 2020

(51) Int. Cl.
*G06F 1/16* (2006.01)
*G06F 1/26* (2006.01)
*H02J 7/00* (2006.01)

(52) U.S. Cl.
CPC .......... *G06F 1/1632* (2013.01); *G06F 1/1616* (2013.01); *G06F 1/26* (2013.01); *H02J 7/0044* (2013.01); *G06F 1/1647* (2013.01); *G06F 1/1669* (2013.01); *G06F 1/1681* (2013.01)

(58) Field of Classification Search
None
See application file for complete search history.

(56) References Cited

U.S. PATENT DOCUMENTS

| | | |
|---|---|---|
| 5,739,810 A | 4/1998 | Merkel |
| 5,847,698 A | 12/1998 | Reavey et al. |
| 6,510,048 B2 | 1/2003 | Rubenson et al. |
| 6,700,773 B1 * | 3/2004 | Adriaansen ........... G06F 1/1618 345/156 |
| 6,922,333 B2 | 7/2005 | Weng et al. |
| 7,061,472 B1 | 7/2006 | Schweizer et al. |
| 7,339,783 B2 * | 3/2008 | McEwan ............... G06F 1/1632 206/320 |
| 7,466,306 B2 * | 12/2008 | Connor ................. G06F 1/1616 345/1.1 |
| 7,551,428 B2 | 7/2009 | Homer et al. |
| 7,663,602 B2 | 2/2010 | Jones et al. |
| 7,990,702 B2 | 8/2011 | Tracy et al. |
| 7,991,442 B2 | 8/2011 | Kim |
| 8,310,823 B2 | 11/2012 | Stoltz |
| 8,331,098 B2 | 12/2012 | Leung |

(Continued)

OTHER PUBLICATIONS

Binary Fortress Software, "Precise Monitor Controls," 2017-2018, 2 pages, retrieved Oct. 15, 2018, available at https://www.displayfusion.com/Features/MonitorConfig/.

(Continued)

*Primary Examiner* — Anthony Q Edwards
*Assistant Examiner* — Rashen E Morrison
(74) *Attorney, Agent, or Firm* — Fogarty LLP

(57) ABSTRACT

A charger stand or dock for multi-form factor Information Handling Systems (IHSs) is described. In some embodiments, a dock may include: a body; a tray insertable into the body, where the tray provides a leaning surface configured to support a display of an IHS in an inclined position; and a cap coupled to the body, where when the dock is open, the cap folds onto the body and increases the leaning surface.

16 Claims, 17 Drawing Sheets

(56) References Cited

U.S. PATENT DOCUMENTS

| | | | | |
|---|---|---|---|---|
| 8,369,082 | B2* | 2/2013 | Madonna | F16M 11/10 |
| | | | | 361/679.41 |
| 8,803,816 | B2 | 8/2014 | Kilpatrick, II et al. | |
| 8,988,876 | B2 | 3/2015 | Corbin et al. | |
| 9,684,342 | B2 | 6/2017 | Kim et al. | |
| 9,740,237 | B2 | 8/2017 | Moore et al. | |
| 9,803,956 | B2* | 10/2017 | Ellingson | A45C 11/00 |
| 9,874,908 | B2 | 1/2018 | Han et al. | |
| 10,728,752 | B2* | 7/2020 | Lee | H04M 1/026 |
| 2004/0001049 | A1 | 1/2004 | Oakley | |
| 2006/0183505 | A1 | 8/2006 | Willrich | |
| 2009/0244016 | A1 | 10/2009 | Casparian et al. | |
| 2010/0039764 | A1* | 2/2010 | Locker | G06F 1/1669 |
| | | | | 361/679.29 |
| 2010/0238620 | A1 | 9/2010 | Fish | |
| 2010/0321275 | A1 | 12/2010 | Hinckley et al. | |
| 2015/0103014 | A1 | 4/2015 | Kim et al. | |
| 2016/0252935 | A1* | 9/2016 | Gueorguiev | G06F 1/1616 |
| | | | | 361/679.09 |
| 2017/0069299 | A1 | 3/2017 | Kwak et al. | |
| 2017/0255320 | A1 | 9/2017 | Kumar et al. | |
| 2017/0344120 | A1 | 11/2017 | Zuniga et al. | |
| 2018/0088632 | A1 | 3/2018 | Dreessen et al. | |
| 2018/0121012 | A1 | 5/2018 | Asrani | |
| 2018/0129391 | A1 | 5/2018 | Files et al. | |
| 2018/0188774 | A1* | 7/2018 | Ent | G06F 1/1618 |
| 2018/0232010 | A1 | 8/2018 | Kummer et al. | |

OTHER PUBLICATIONS

Microsoft, "ChangeDisplaySettingsExA function," 7 pages, retrieved Oct. 15, 2018, available at https://msdn.microsoft.com/en-us/library/dd183413(v=vs.85).aspx VS. https://docs.microsoft.com/en-us/windows/desktop/api/winuser/nf-winuser-changedisplaysettingsexa.

Microsoft, "SendKeys.Send(String) Method," 6 pages, retrieved Oct. 11, 2018, available at https://msdn.microsoft.com/en-us/library/system.windows.forms.sendkeys.send(v=vs.110).aspx.

Microsoft, "DoDragDrop function," 4 pages, retrieved Oct. 11, 2018, available at https://msdn.microsoft.com/en-us/library/windows/desktop/ms678486(v=vs.85).aspx.

Microsoft, "System Events and Mouse Messages," published May 30, 2018, 4 pages, retrieved Oct. 11, 2018, available at https://msdn.microsoft.com/en-us/library/windows/desktop/ms703320(v=vs.85).aspx.

Microsoft, "InkSystemGesture Enumeration," 3 pages, retrieved Oct. 11, 2018, available at https://msdn.microsoft.com/en-us/library/windows/desktop/ms695579(v=vs.85).aspx.

Microsoft, "GetWindowRect function," 3 pages, retrieved Oct. 11, 2018, available at https://msdn.microsoft.com/en-us/library/windows/desktop/ms633519(v=vs.85).aspx.

Microsoft, "PointerRoutedEventArgs Class," 9 pages, retrieved Oct. 11, 2018, available at https://docs.microsoft.com/en-us/uwp/api/Windows.UI.Xaml.Input.PointerRoutedEventArgs#Windows_UI_Xaml_Input_PointerRoutedEventArgs_GetCurrentPoint_Windows_UI_Xaml_UIElement_.

Microsoft, "SetWindowPos function," 7 pages, retrieved Oct. 11, 2018, available at https://msdn.microsoft.com/en-us/library/windows/desktop/ms633545(v=vs.85).aspx.

Microsoft, "Time Functions," published May 30, 2018, 5 pages, retrieved Oct. 11, 2018, available at https://msdn.microsoft.com/en-us/library/windows/desktop/ms725473(v=vs.85).aspx.

Microsoft, "How Do I Detect a Window Open Event," 11 pages, retrieved Oct. 15, 2018, available at https://social.msdn.microsoft.com/Forums/vstudio/en-US/1953f400-6f1c-49e0-a63e-d724bccc7676/how-do-i-detect-a-window-open-event?forum=csharpgeneral.

Microsoft, "How Do I Maximize/Minimize Applications Programmatically in C#?," 2 pages, retrieved Oct. 15, 2018, available at https://social.msdn.microsoft.com/Forums/vstudio/en-US/9bde4870-1599-4958-9ab4-902fa98ba53a/how-do-i-maximizeminimize-applications-programmatically-in-c?forum=csharpgeneral.

Microsoft, "WinMain Entry Point," 7 pages, retrieved Oct. 15, 2018, available at https://msdn.microsoft.com/en-us/library/ms633559(vs.85).aspx.

Stack Overflow, "Flow Can I Split a Window in Two in Windows API," 6 pages, retrieved Oct. 15, 2018, available at https://stackoverflow.com/questions/10467112/how-can-i-split-a-window-in-two-in-windows-api.

Microsoft, "Application User Model IDs (AppUserModelIDs)," published May 30, 2018, 8 pages, retrieved Oct. 15, 2018, available at https://docs.microsoft.com/en-us/windows/desktop/shell/appids.

Microsoft, "Mouse Events in Windows Forms," published Mar. 29, 2017, 6 pages, retrieved Oct. 15, 2018, available at https://docs.microsoft.com/en-us/dotnet/framework/winforms/mouse-events-in-windows-forms.

* cited by examiner

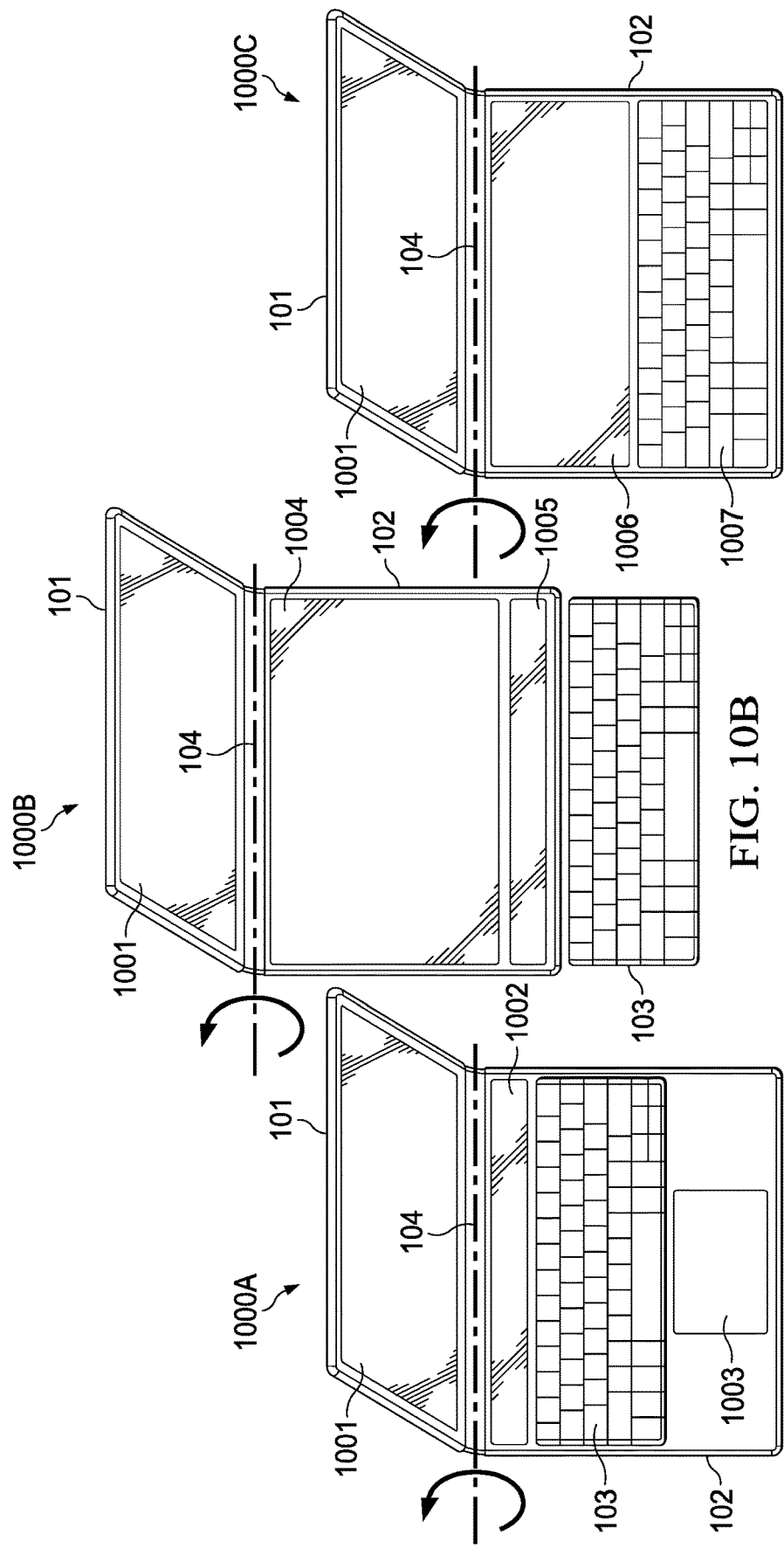

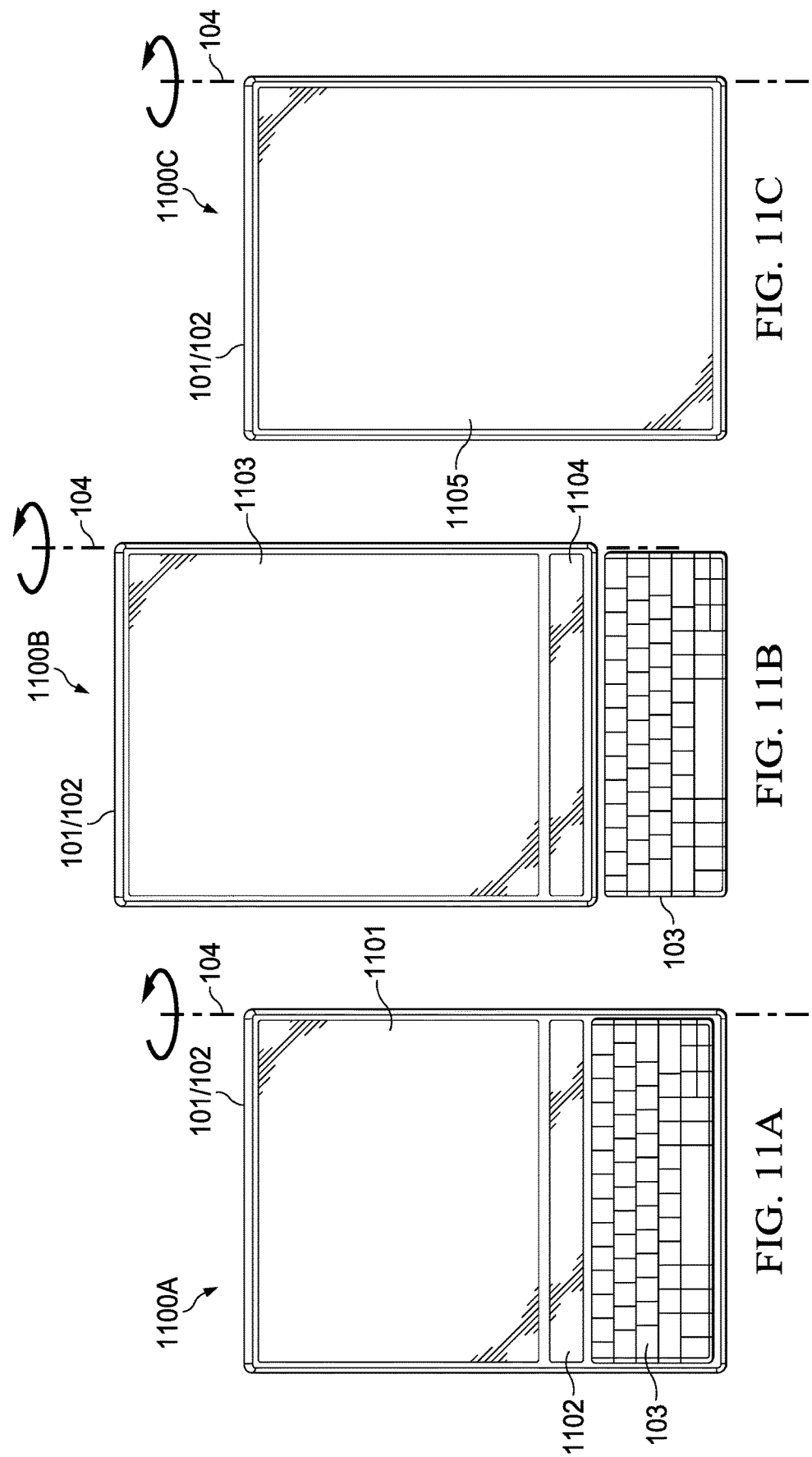

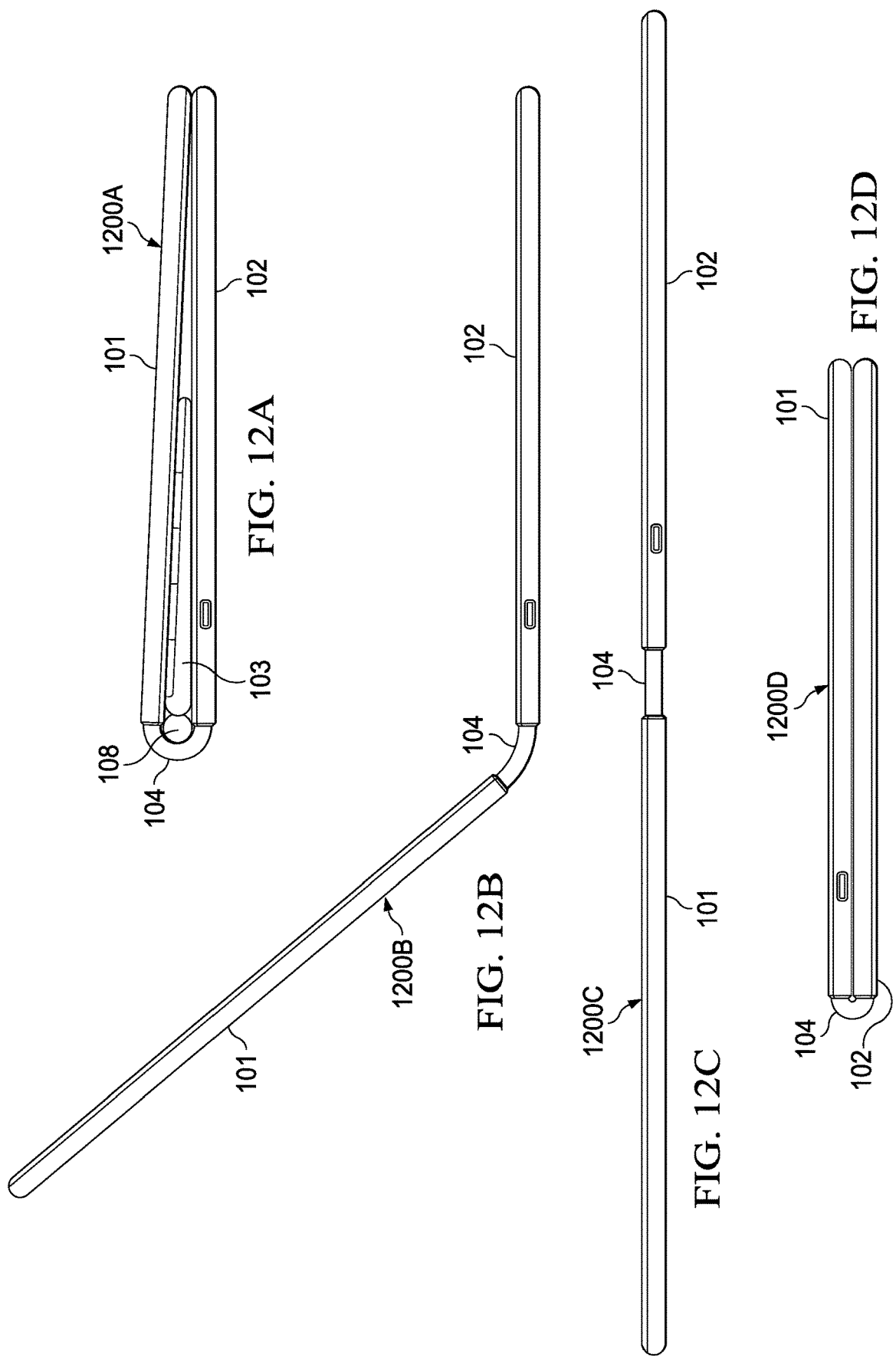

CHARGER STAND FOR MULTI-FORM FACTOR INFORMATION HANDLING SYSTEMS (IHSS)

FIELD

This disclosure relates generally to Information Handling Systems (IHSs), and more specifically, to a charger stand for multi-form factor IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Nowadays, users can choose among many different types of mobile IHS devices. Each type of device (e.g., tablets, 2-in-1s, mobile workstations, notebooks, netbooks, ultrabooks, etc.) has unique portability, performance, and usability features; however, each also has its own trade-offs and limitations. For example, tablets have less compute power than notebooks and workstations, while notebooks and workstations lack the portability of tablets. A conventional 2-in-1 device combines the portability of a tablet with the performance of a notebook, but with a small display—an uncomfortable form factor in many use-cases.

The inventors hereof have determined that, as productivity continues to be a core tenet of modern computing, mobile IHS devices should provide versatility for many use-cases and display postures in use today (e.g., tablet mode, laptop mode, etc.), as well as future display postures (e.g., digital notebooks, new work surfaces, etc.). Additionally, mobile IHS devices should provide larger display area with reduced size and weight.

SUMMARY

Embodiments of a charger stand for multi-form factor Information Handling Systems (IHSs) are described. In an illustrative, non-limiting embodiment, a dock may include: a body; a tray insertable into the body, where the tray provides a leaning surface configured to support a display of an IHS in an inclined position; and a cap coupled to the body, where when the dock is open, the cap folds onto the body and increases the leaning surface.

When the dock is closed, the cap holds the tray inside the body. The tray is insertable into the body against a tray spring configured to push the tray outward. The tray is also coupled to the body via a pair of spring-loaded stoppers configured to slide within rails disposed on the internal surface of the body. The cap is coupled to the body via a dual-axis hinge. The dock also includes a latch coupling the cap to the body, where the latch is usable to open and close the dock. The latch may be coupled to a leaf spring configured to maintain the cap closed against the body, while resisting action of the tray spring upon the tray when the dock is a closed position.

In some cases, the cap approximately doubles the leaning surface area when folded onto the body. The also may also include an electrical connector coupled to the tray, where the IHS is coupled to the electrical connector when the display is supported by the leaning surface. The dock may further include a power supply disposed within the body and coupled to the electrical connector, where the power supply is configured to at least one of: power the IHS; or charge a battery of the IHS.

In another illustrative, non-limiting embodiment, a method may include activating a latch of a dock, where the dock comprises: (i) a body, (ii) a tray, and (iii) a cap, and where activating the latch causes the cap to fold over the body; and placing an IHS in the tray against the folded cap. The folded cap increases a leaning surface of the tray. The cap is coupled to the body via a hinge disposed on a side of the body opposite the latch.

Placing the IHS in the tray may include coupling the IHS to an electrical connector on the tray, and the method may further include powering or charging the IHS via the electrical connector. Prior to activation, the latch may be configured to maintain the cap closed against the body under action of a leaf spring coupled to the body. The method may also include: removing the IHS from the tray; rotating the cap around the hinge to insert the tray into the body; and engaging the latch against the leaf spring.

In yet another illustrative, non-limiting embodiment, an IHS may include a processor; and a memory coupled to the processor, the memory having program instructions that, upon execution by the processor, cause the IHS to: detect a connection of the IHS to a dock configured to hold at least one display up against a support surface; and power or charge the IHS via the connection, where the dock comprises: (i) a body, (ii) a tray that provides a first portion of the support surface, and (iii) a cap folded over the body that provides a second portion of the support surface.

The cap may be coupled to the body via a dual-axis hinge. The dock may include a latch coupling the cap to the body, where the latch is usable to open and close the dock. Moreover, the latch may be coupled to a leaf spring configured to maintain the cap closed against the body, while resisting action of the tray spring upon the tray when the dock is closed.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 10A-C and 11A-C illustrate various use-cases, according to some embodiments.

FIGS. 12A-D illustrate a hinge implementation, according to some embodiments.

DETAILED DESCRIPTION

Embodiments described herein provide a charger stand or docking system ("dock") for multi-form factor Information Handling Systems (IHSs). In various implementations, a mobile IHS device may include a dual-display, foldable IHS. Each display may include, for example, a Liquid Crystal Display (LCD), Organic Light-Emitting Diode (OLED), or Active Matrix OLED (AMOLED) panel or film, equipped with a touchscreen configured to receive touch inputs. The dual-display, foldable IHS may be configured by a user in any of a number of display postures, including, but not limited to: laptop, tablet, book, clipboard, stand, tent, and/or display.

A user may operate the dual-display, foldable IHS in various modes using a virtual, On-Screen Keyboard (OSK), or a removable, physical keyboard. In some use cases, a physical keyboard may be placed atop at least one of the screens to enable use of the IHS as a laptop, with additional User Interface (UI) features (e.g., virtual keys, touch input areas, etc.) made available via the underlying display, around the keyboard. In other use cases, the physical keyboard may be placed in front of the IHS to expose a larger display area. The user may also rotate the dual-display, foldable IHS, to further enable different modalities with the use of the physical keyboard. In some cases, when not in use, the physical keyboard may be placed or stored inside the dual-display, foldable IHS.

Figure 1:
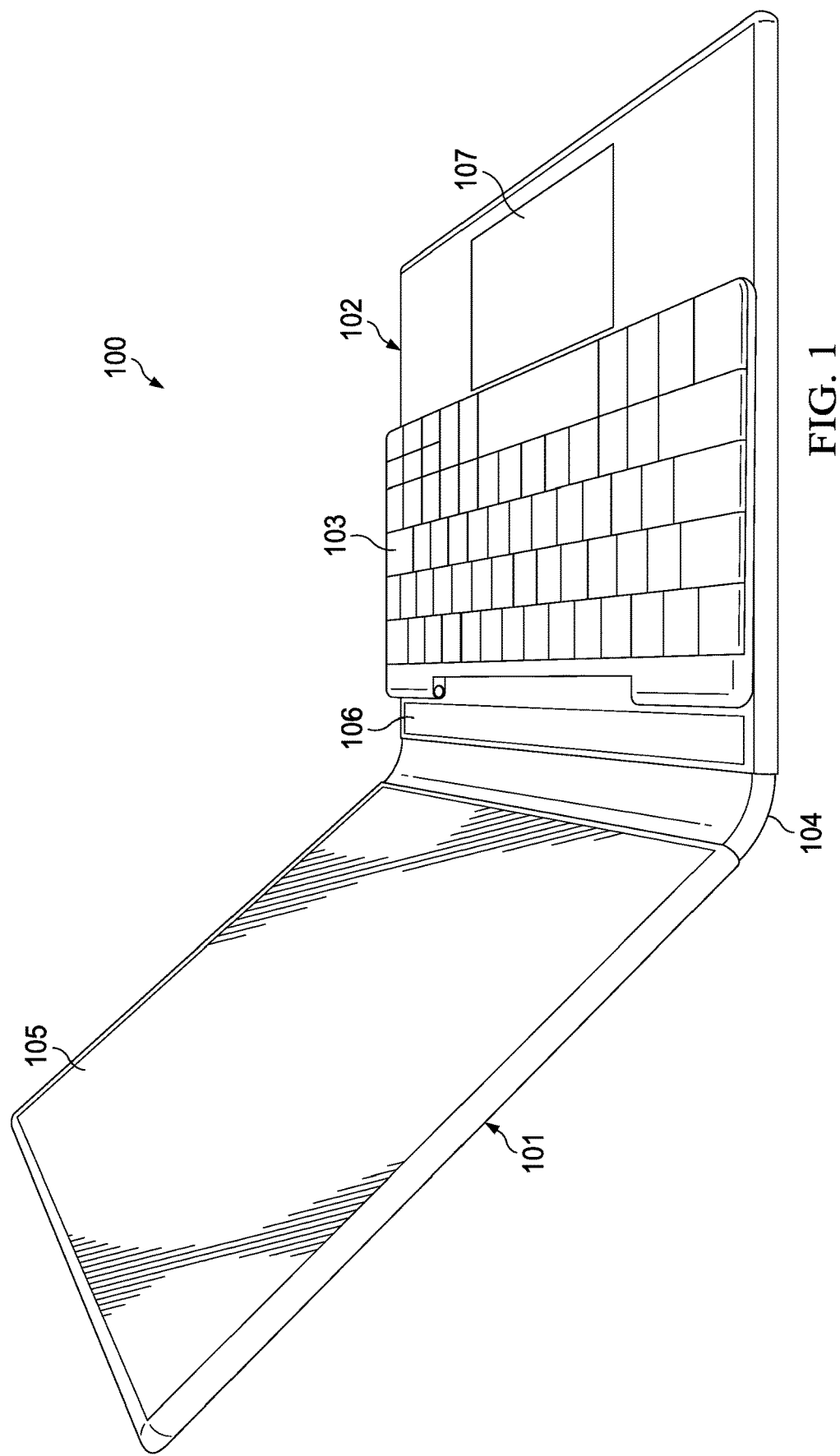
FIG. 1 is a perspective view of a multi-form factor Information Handling System (IHS) with a removable keyboard, according to some embodiments.

FIG. 1 is a perspective view of multi-form factor Information Handling System (IHS) 100 with removable keyboard 103. As shown, first display 101 is coupled to second display 102 via hinge 104, and keyboard 103 sits atop second display 102. The current physical arrangement of first display 101 and second display 102 creates a laptop posture, such that first display 101 becomes primary display area 105 presented by IHS 100, where video or display frames may be rendered for viewing by a user.

In operation, in this particular laptop posture, second display 102 may sit horizontally on a work surface with its display surface facing up, and keyboard 103 may be positioned on top of second display 102, occluding a part of its display surface. In response to this posture and keyboard position, IHS 100 may dynamically produce a first UI feature in the form of at least one configurable secondary display area 106 (a "ribbon area" or "touch bar"), and/or a second UI feature in the form of at least one configurable touch input area 107 (a "virtual trackpad"), using the touch-screen of second display 102.

To identify a current posture of IHS 100 and a current physical relationship or spatial arrangement (e.g., distance, position, speed, etc.) between display(s) 101/102 and keyboard 103, IHS 100 may be configured to use one or more sensors disposed in first display 101, second display 102, keyboard 103, and/or hinge 104. Based upon readings from these various sensors, IHS 100 may then select, configure, modify, and/or provide (e.g., content, size, position, etc.) one or more UI features.

In various embodiments, displays 101 and 102 may be coupled to each other via hinge 104 to thereby assume a plurality of different postures, including, but not limited, to: laptop, tablet, book, or display.

When display 102 is disposed horizontally in laptop posture, keyboard 103 may be placed on top of display 102, thus resulting in a first set of UI features (e.g., ribbon area or touch bar 106, and/or touchpad 107). Otherwise, with IHS 100 still in the laptop posture, keyboard 103 may be placed next to display 102, resulting in a second set of UI features.

As used herein, the term "ribbon area" or "touch bar" 106 refers to a dynamic horizontal or vertical strip of selectable and/or scrollable items, which may be dynamically selected for display and/or IHS control depending upon a present context, use-case, or application. For example, when IHS 100 is executing a web browser, ribbon area or touch bar 106 may show navigation controls and favorite websites. Then, when IHS 100 operates a mail application, ribbon area or touch bar 106 may display mail actions, such as replying or flagging. In some cases, at least a portion of ribbon area or touch bar 106 may be provided in the form of a stationary control strip, providing access to system features such as brightness and volume. Additionally, or alternatively, ribbon area or touch bar 106 may enable multitouch, to support two or more simultaneous inputs.

In some cases, ribbon area 106 may change position, location, or size if keyboard 103 is moved alongside a lateral or short edge of second display 102 (e.g., from horizontally displayed alongside a long side of keyboard 103 to being vertically displayed alongside a short side of keyboard 103). Also, the entire display surface of display 102 may show rendered video frames if keyboard 103 is moved alongside the bottom or long edge of display 102. Conversely, if keyboard 103 is removed of turned off, yet another set of UI features, such as an OSK, may be provided via display(s) 101/102. As such, in many embodiments, the distance and/or relative position between keyboard 103 and display(s) 101/102 may be used to control various aspects the UI.

During operation, the user may open, close, flip, swivel, or rotate either of displays 101 and/or 102, via hinge 104, to produce different postures. In each posture, a different arrangement between IHS 100 and keyboard 103 results in different UI features being presented or made available to the user. For example, when second display 102 is folded against display 101 so that the two displays have their backs against each other, IHS 100 may be said to have assumed a tablet posture (e.g., FIG. 7G) or book posture (e.g., FIG. 8D), depending upon whether IHS 100 is stationary, moving, horizontal, resting at a different angle, and/or its orientation (landscape vs. portrait).

In many of these scenarios, placement of keyboard 103 upon or near display(s) 101/102, and subsequent movement or removal, may result in a different set of UI features than when IHS 100 is in laptop posture.

In many implementations, different types of hinges 104 may be used to achieve and maintain different display postures, and to support different keyboard arrangements. Examples of suitable hinges 104 include, but are not limited to, the 360-hinge shown in FIGS. 12A-D). Hinge 104 may include wells or compartments for docking, cradling, charging, or storing accessories. Moreover, one or more aspects of hinge 104 may be monitored via one or more sensors (e.g., to determine whether an accessory is charging) when controlling the different UI features.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
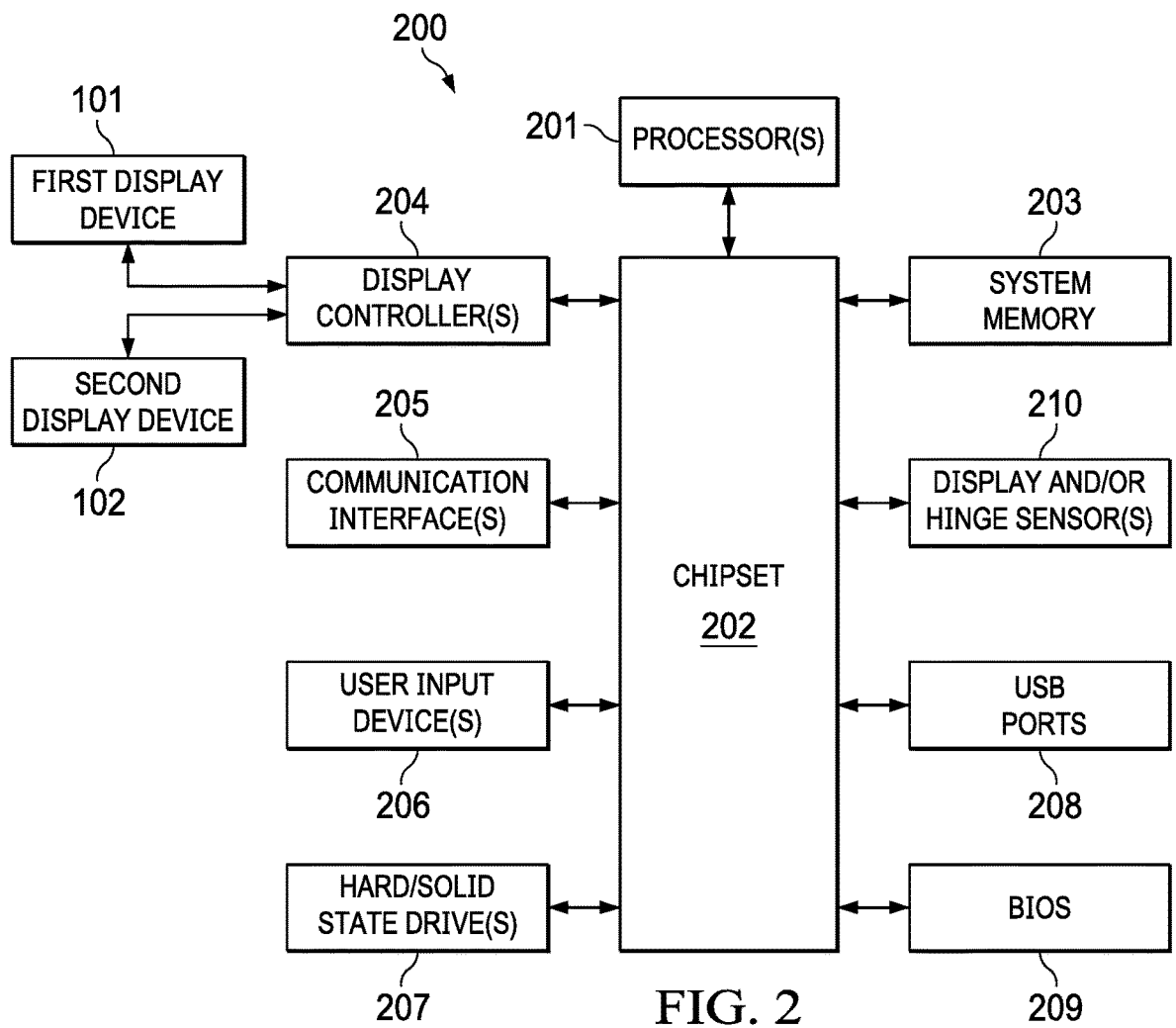
FIGS. 2 and 3 are block diagrams of components of the multi-form factor IHS and removable keyboard, respectively, according to some embodiments.

FIG. 2 is a block diagram of components 200 of multiform factor IHS 100. As depicted, components 200 include processor 201. In various embodiments, IHS 100 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 coupled to processor 201. In certain embodiments, chipset 202 may utilize a QuickPath Interconnect (QPI) bus to communicate with processor 201. In various embodiments, chipset 202 may provide processor 201 with access to a number of resources. Moreover, chipset 202 may be coupled to communication interface(s) 205 to enable communications via various wired and/or wireless networks, such as Ethernet, WiFi, BLUETOOTH, cellular or mobile networks (e.g., CDMA, TDMA, LTE, etc.), satellite networks, or the like. For example, communication interface(s) 205 may be coupled to chipset 202 via a PCIe bus.

Chipset 202 may be coupled to display controller(s) 204, which may include one or more or graphics processor(s) (GPUs) on a graphics bus, such as an Accelerated Graphics Port (AGP) or Peripheral Component Interconnect Express (PCIe) bus. As shown, display controller(s) 204 provide video or display signals to first display device 101 and second display device 202. In other implementations, any number of display controller(s) 204 and/or display devices 101/102 may be used.

Each of display devices 101 and 102 may include a flexible display that is deformable (e.g., bent, folded, rolled, or stretched) by an external force applied thereto. For example, display devices 101 and 102 may include LCD, OLED, or AMOLED, plasma, electrophoretic, or electrowetting panel(s) or film(s). Each display device 101 and 102 may include a plurality of pixels arranged in a matrix, configured to display visual information, such as text, two-dimensional images, video, three-dimensional images, etc.

Display device(s) 101/102 may be configured to sense haptic and/or physical touch events, and to generate touch information. To this end, display device(s) 101/102 may include a touchscreen matrix (e.g., a layered capacitive panel or the like) and/or touch controller configured to receive and interpret multi-touch gestures from a user touching the screen with a stylus or one or more fingers. In some cases, display and touch control aspects of display device(s) 101/102 may be collectively operated and controlled by display controller(s) 204.

In some cases, display device(s) 101/102 may also comprise a deformation or bending sensor configured to generate deformation or bending information including, but not limited to: the bending position of a display (e.g., in the form of a "bending line" connecting two or more positions at which bending is detected on the display), bending direction, bending angle, bending speed, etc. In these implementations, display device(s) 101/102 may be provided as a single continuous display, rather than two discrete displays.

Chipset 202 may also provide processor 201 and/or display controller(s) 204 with access to memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or controller(s) 204, present a UI interface to a user of IHS 100.

Chipset 202 may further provide access to one or more hard disk and/or solid-state drives 207. In certain embodiments, chipset 202 may also provide access to one or more optical drives or other removable-media drives. In certain embodiments, chipset 202 may also provide access to one or more Universal Serial Bus (USB) ports 208.

Upon booting of IHS 100, processor(s) 201 may utilize Basic Input/Output System (BIOS) 209 instructions to initialize and test hardware components coupled to IHS 100 and to load an Operating System (OS) for use by IHS 100. BIOS 209 provides an abstraction layer that allows the OS to interface with certain hardware components that are utilized by IHS 100. Via the hardware abstraction layer provided by BIOS 209, software stored in memory 203 and executed by the processor(s) 201 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 202 may also provide access to one or more user input devices 206, for example, using a super I/O controller or the like. For instance, chipset 202 may provide access to a keyboard (e.g., keyboard 103), mouse, trackpad, stylus, totem, or any other peripheral input device, including touchscreen displays 101 and 102. These input devices may interface with chipset 202 through wired connections (e.g., in the case of touch inputs received via display controller(s) 204) or wireless connections (e.g., via communication interfaces(s) 205). In some cases, chipset 202 may be used to interface with user input devices such as keypads, biometric scanning devices, and voice or optical recognition devices.

In certain embodiments, chipset 202 may also provide an interface for communications with one or more sensors 210. Sensors 210 may be disposed within displays 101/102 and/or hinge 104, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Figure 3:
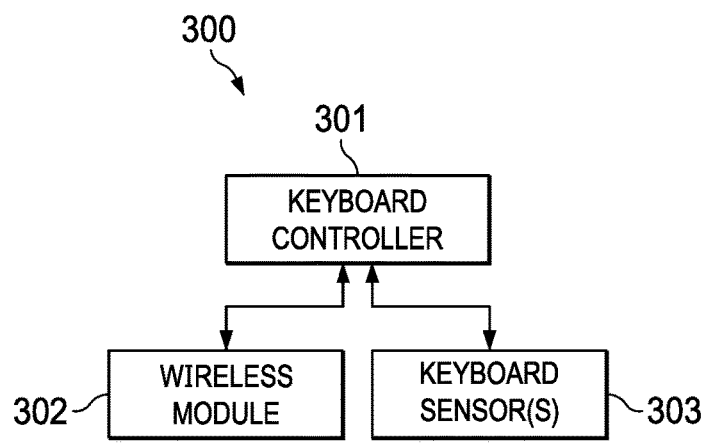

FIG. 3 is a block diagram of components 300 of keyboard IHS 103. As depicted, components 300 include keyboard controller or processor 301, coupled to keyboard sensor(s) 303 and wireless communication module 302. In various embodiments, keyboard controller 301 may be configured to detect keystrokes made by user upon a keyboard matrix, and it may transmit those keystrokes to IHS 100 via wireless module 302 using a suitable protocol (e.g., BLUETOOTH). Keyboard sensors 303, which may also include any of the aforementioned types of sensor(s), may be disposed under keys and/or around the keyboard's enclosure, to provide information regarding the location, arrangement, or status of keyboard 103 to IHS 100 via wireless module 302.

In various embodiments, IHS 100 and/or keyboard 103 may not include all of components 200 and/or 300 shown in FIGS. 2 and 3, respectively. Additionally, or alternatively, IHS 100 and/or keyboard 103 may include components in addition to those shown in FIGS. 2 and 3, respectively. Additionally, or alternatively, components 200 and/or 300, represented as discrete in FIGS. 2 and 3, may be integrated with other components. For example, all or a portion of the functionality provided by components 200 and/or 300 may be provided as a System-On-Chip (SOC), or the like.

Figure 4:
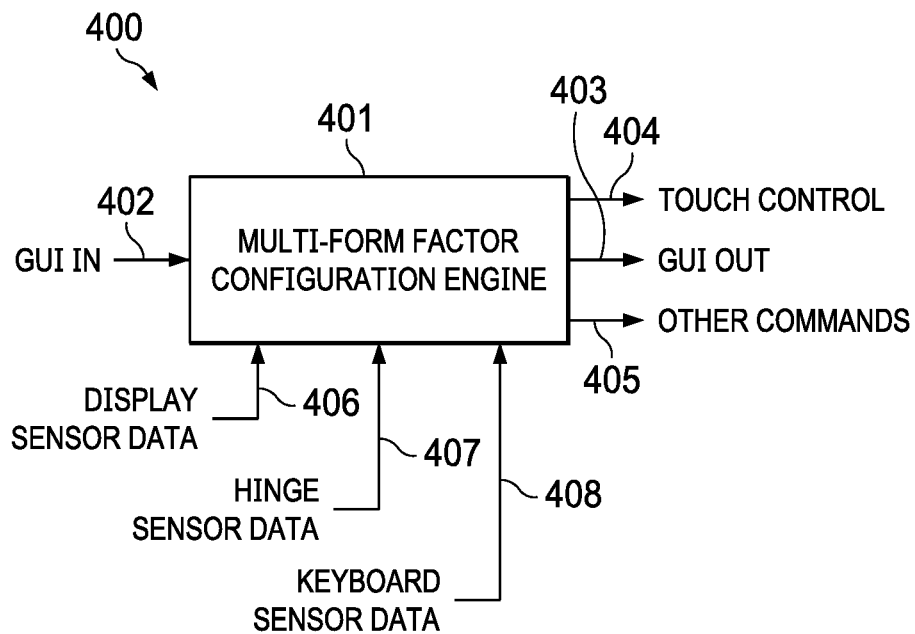
FIG. 4 is a block diagram of a multi-form factor configuration engine, according to some embodiments.

FIG. 4 is a block diagram of multi-form factor configuration engine 401. Particularly, multi-form factor configuration engine 401 may include electronic circuits and/or program instructions that, upon execution, cause IHS 100 to perform a number of operation(s) and/or method(s) described herein.

In various implementations, program instructions for executing multi-form factor configuration engine 401 may be stored in memory 203. For example, engine 401 may include one or more standalone software applications, drivers, libraries, or toolkits, accessible via an Application Programming Interface (API) or the like. Additionally, or alternatively, multi-form factor configuration engine 401 may be included the IHS's OS.

In other embodiments, however, multi-form factor configuration engine 401 may be implemented in firmware and/or executed by a co-processor or dedicated controller, such as a Baseband Management Controller (BMC), or the like.

As illustrated, multi-form factor configuration engine 401 receives Graphical User Interface (GUI) input or feature 402, and produces GUI output or feature 403, in response to receiving and processing one or more or: display sensor data 406, hinge sensor data 407, and/or keyboard sensor data 408. Additionally, or alternatively, multi-form factor configuration engine 401 may produce touch control feature 404 and/or other commands 405.

In various embodiments, GUI input 402 may include one or more images to be rendered on display(s) 101/102, and/or one or more entire or partial video frames. Conversely, GUI output 403 may include one or more modified images (e.g., different size, color, position on the display, etc.) to be rendered on display(s) 101/102, and/or one or more modified entire or partial video frames.

For instance, in response to detecting, via display and/or hinge sensors 406/407, that IHS 100 has assumed a laptop posture from a closed or "off" posture, GUI OUT 403 may allow a full-screen desktop image, received as GUI IN 402, to be displayed first display 101 while second display 102 remains turned off or darkened. Upon receiving keyboard sensor data 408 indicating that keyboard 103 has been positioned over second display 102, GUI OUT 403 may produce a ribbon-type display or area 106 around the edge(s) of keyboard 103, for example, with interactive and/or touch selectable virtual keys, icons, menu options, pallets, etc. If keyboard sensor data 408 then indicates that keyboard 103 has been turned off, for example, GUI OUT 403 may produce an OSK on second display 102.

Additionally, or alternatively, touch control feature 404 may be produced to visually delineate touch input area 107 of second display 102, to enable its operation as a user input device, and to thereby provide an UI interface commensurate with a laptop posture. Touch control feature 404 may turn palm or touch rejection on or off in selected parts of display(s) 101/102. Also, GUI OUT 403 may include a visual outline displayed by second display 102 around touch input area 107, such that palm or touch rejection is applied outside of the outlined area, but the interior of area 107 operates as a virtual trackpad on second display 102.

Multi-form factor configuration engine 401 may also produce other commands 405 in response to changes in display posture and/or keyboard state or arrangement, such as commands to turn displays 101/102 on or off, enter a selected power mode, charge or monitor a status of an accessory device (e.g., docked in hinge 104), etc.

Figure 5:
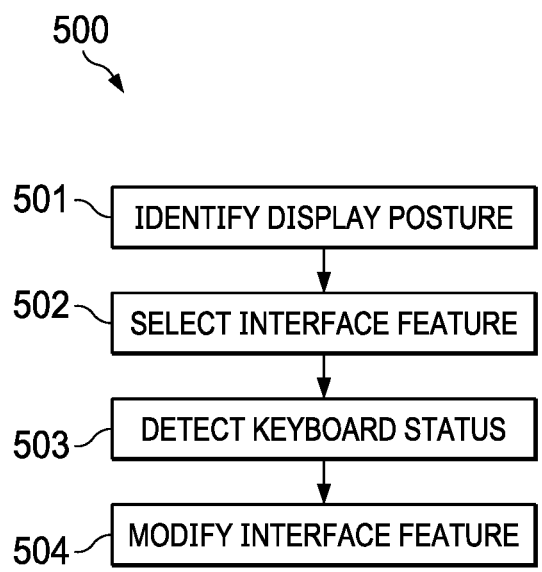
FIG. 5 is a flowchart of a method for configuring multi-form factor IHSs, according to some embodiments.

FIG. 5 is a flowchart of method 500 for configuring multi-form factor IHSs. In various embodiments, method 500 may be performed by multi-form factor configuration engine 401 under execution of processor 201. At block 501, method 500 includes identifying a display posture—that is, a relative physical arrangement between first display 101 and second display 102. For example, block 501 may use sensor data received from displays 101/102 and/or hinge 104 to distinguish among the various postures shown below.

At block 502, method 500 selects a UI feature corresponding to the identified posture. Examples of UI features include, but are not limited to: turning a display on or off; displaying a full or partial screen GUI; displaying a ribbon area; providing a virtual trackpad area; altering touch control or palm rejection settings; adjusting the brightness and contrast of a display; selecting a mode, volume, and/or or directionality of audio reproduction; etc.

At block 503, method 500 may detect the status of keyboard 103. For example, block 503 may determine that keyboard 103 is on or off, resting between two closed displays, horizontally sitting atop display(s) 101/102, or next to display(s) 101/102. Additionally, or alternatively, block 503 may determine the location or position of keyboard 103 relative to display 102, for example, using Cartesian coordinates. Additionally, or alternatively, block 503 may determine an angle between keyboard 103 and displays 101/102 (e.g., a straight angle if display 102 is horizontal, or a right angle if display 102 is vertical).

Then, at block 504, method 500 may modify the UI feature in response to the status of keyboard 103. For instance, block 504 may cause a display to turn on or off, it may change the size or position of a full or partial screen GUI or a ribbon area, it may change the size or location of a trackpad area with changes to control or palm rejection settings, etc. Additionally, or alternatively, block 504 may produce a new interface feature or remove an existing feature, associated with a display posture, in response to any aspect of the keyboard status meeting a selected threshold of falling within a defined range of values.

FIGS. 6A-C, 7A-J, 8A-D, and 9A-F illustrate examples of laptop, tablet, book, and display postures which may be detected by operation of block 501 of method 500 during execution of multi-form factor configuration engine 401 by IHS 100.

Figure 6A:
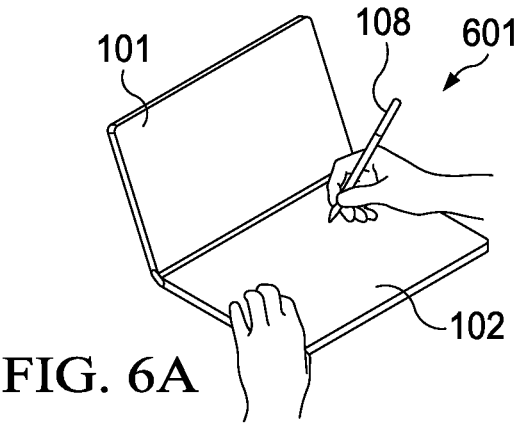
FIGS. 6A-C, 7A-J, 8A-D, and 9A-F illustrate examples of laptop, tablet, book, and display postures, respectively, according to some embodiments.
Figure 6B:
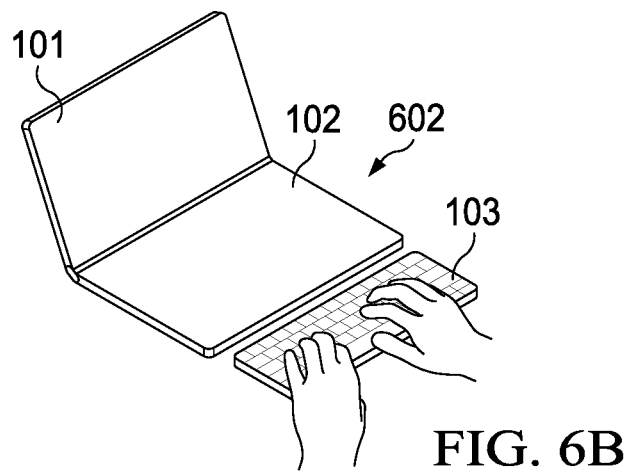
Figure 6C:
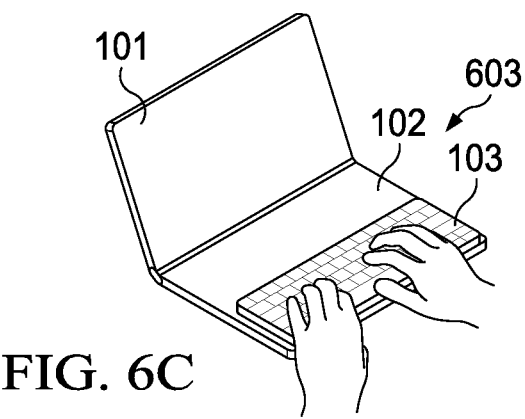

Particularly, FIGS. 6A-C show a laptop posture, where a first display surface of first display 101 is facing the user at an obtuse angle with respect to a second display surface of second display 102, and such that second display 102 is disposed in a horizontal position, with the second display surface facing up. In FIG. 6A, state 601 shows a user operating IHS 100 with a stylus or touch on second display 102. In FIG. 6B, state 602 shows IHS 100 with keyboard 103 positioned off the bottom edge or long side of second display 102, and in FIG. 6C, state 603 shows the user operating keyboard 103 atop second display 102.

Figure 7A:
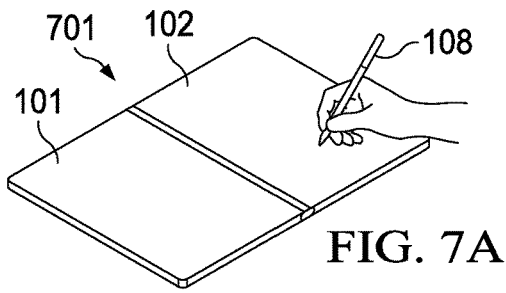
Figure 7B:
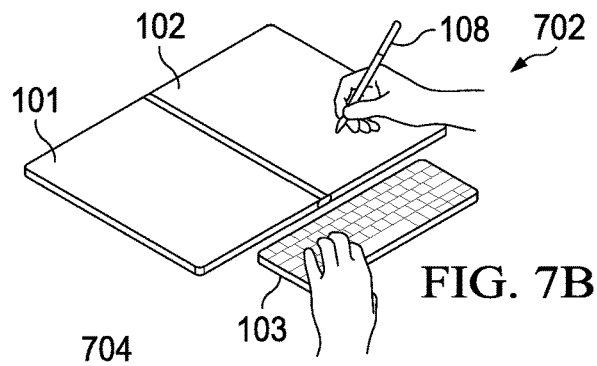
Figure 7C:
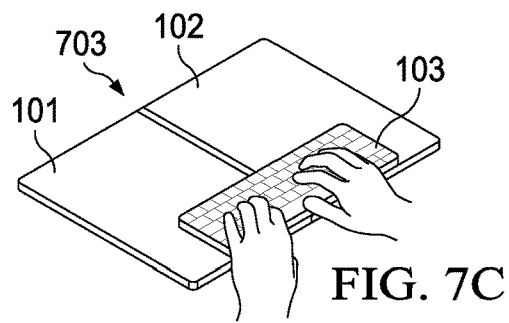
Figure 7D:
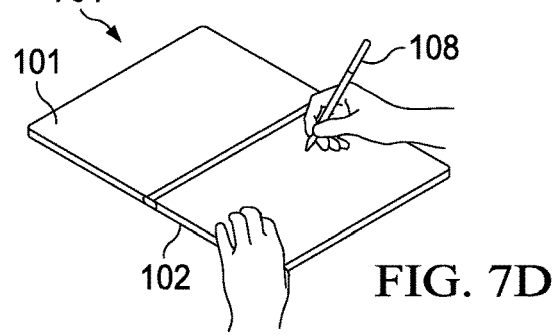
Figure 7E:
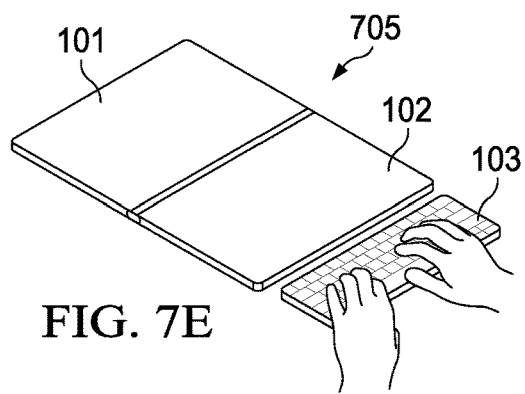
Figure 7F:
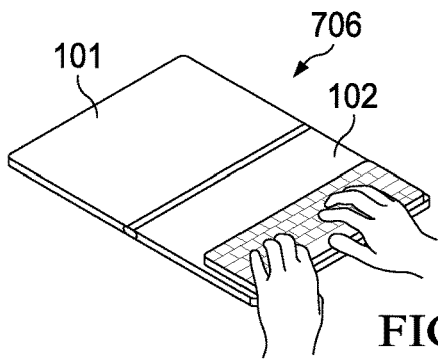

FIGS. 7A-J show a tablet posture, where first display 101 is at a straight angle with respect to second display 102, such that first and second displays 101 and 102 are disposed in a horizontal position, with the first and second display surfaces facing up. Specifically, FIG. 7A shows state 701 where IHS 100 is in a side-by-side, portrait orientation without keyboard 103, FIG. 7B shows state 702 where keyboard 103 is being used off the bottom edges or short sides of display(s) 101/102, and FIG. 7C shows state 703 where keyboard 103 is located over both displays 101 and 102. In FIG. 7D, state 704 shows IHS 100 in a side-by-side, landscape configuration without keyboard 103, in FIG. 7E state 705 shows keyboard 103 being used off the bottom edge or long side of second display 102, and in FIG. 7F state 706 shows keyboard 103 on top of second display 102.

Figure 7G:
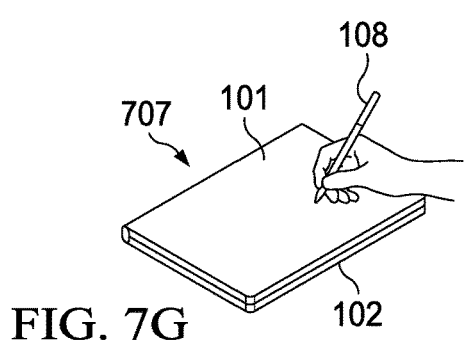
Figure 7H:
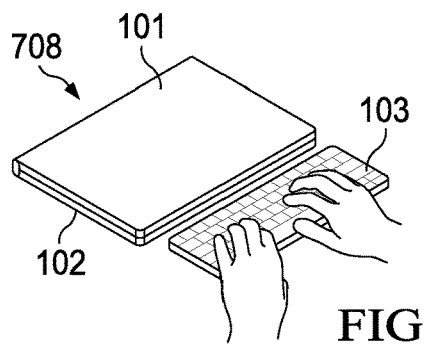
Figure 7I:
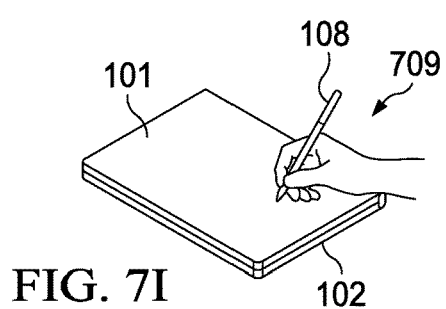
Figure 7J:
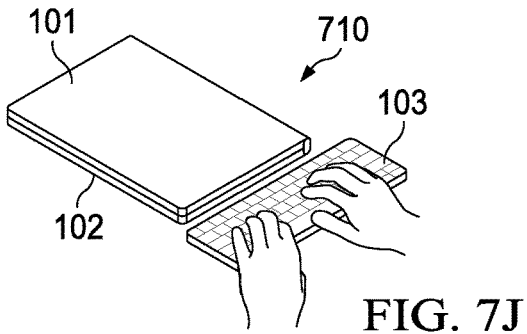

In FIG. 7G, state 707 shows first display 101 rotated around second display 102 via hinge 104 such that the display surface of second display 102 is horizontally facing down, and first display 101 rests back-to-back against second display 102, without keyboard 103; and in FIG. 7H, state 708 shows the same configuration, but with keyboard 103 placed off the bottom or long edge of display 102. In FIGS. 7I and 7J, states 709 and 710 correspond to states 707 and 708, respectively, but with IHS 100 in a portrait orientation.

Figure 8A:
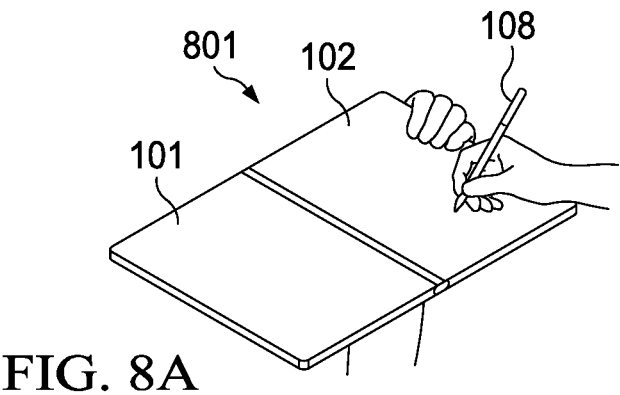
Figure 8B:
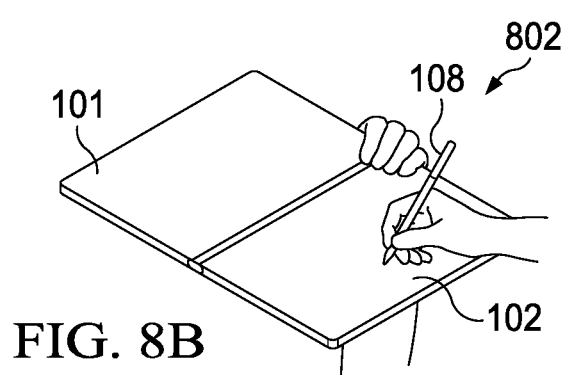
Figure 8C:
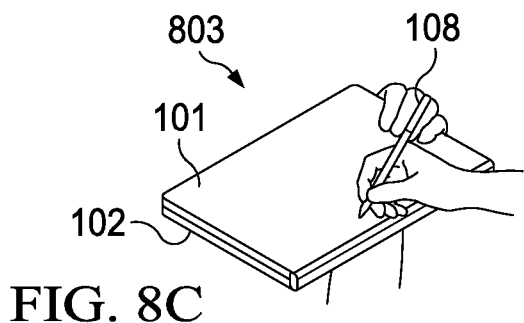
Figure 8D:
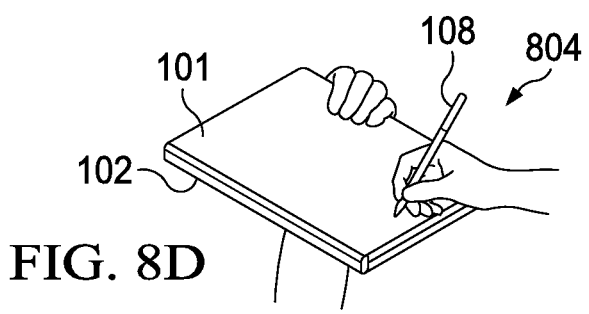

FIG. 8A-D show a book posture, similar to the tablet posture of FIGS. 7A-J, but such that neither one of displays 101 or 102 is horizontally held by the user and/or such that the angle between the display surfaces of the first and second displays 101 and 102 is other than a straight angle. In FIG. 8A, state 801 shows dual-screen use in portrait orientation, in FIG. 8B state 802 shows dual-screen use in landscape orientation, in FIG. 8C state 803 shows single-screen use in landscape orientation, and in FIG. 8D state 804 shows single-screen use in portrait orientation.

Figure 9A:
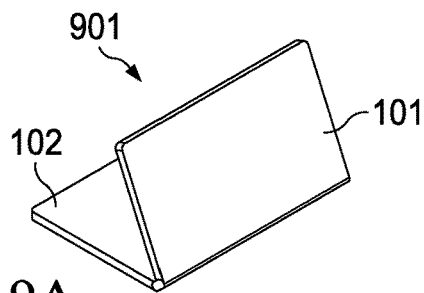
Figure 9B:
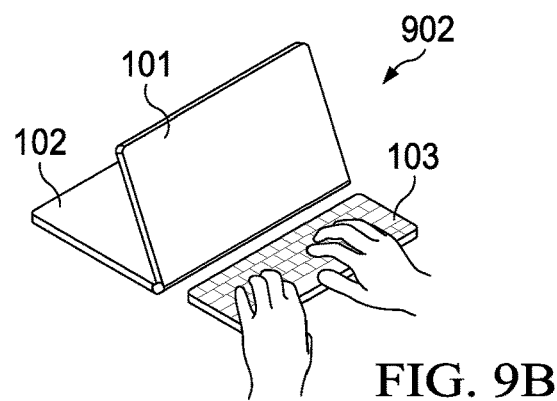
Figure 9C:
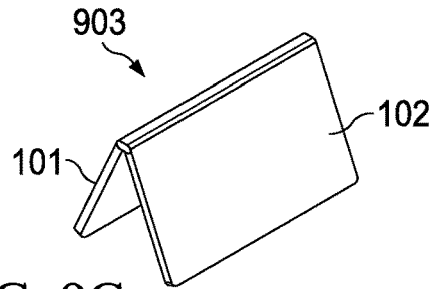
Figure 9D:
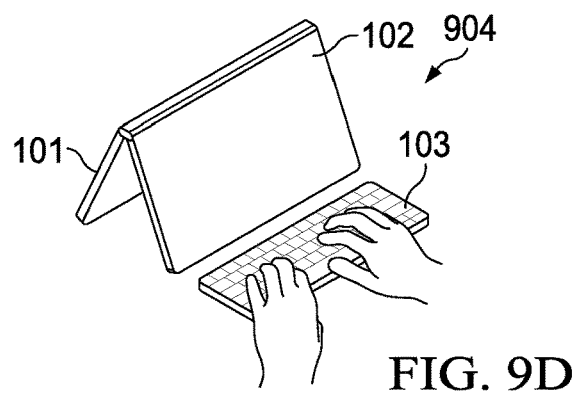

FIGS. 9A-F show a display posture, where first display 100 is at an acute angle with respect to second display 102, and/or where both displays are vertically arranged in a portrait orientation. Particularly, in FIG. 9A state 901 shows a first display surface of first display 102 facing the user and the second display surface of second display 102 horizontally facing down, whereas in FIG. 9B state 902 shows the same configuration but with keyboard 103 used off the bottom edge or long side of display 101. In FIG. 9C, state 903 shows a display posture where display 102 props up display 101 in a stand configuration, and in FIG. 9D, state 904 shows the same configuration but with keyboard 103 used off the bottom edge or long side of display 101.

Figure 9E:
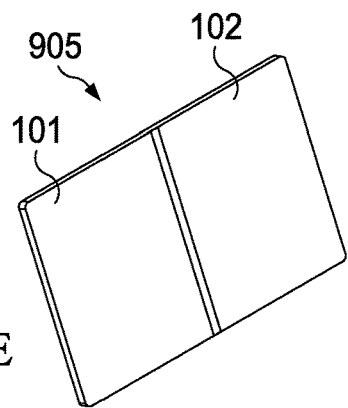
Figure 9F:
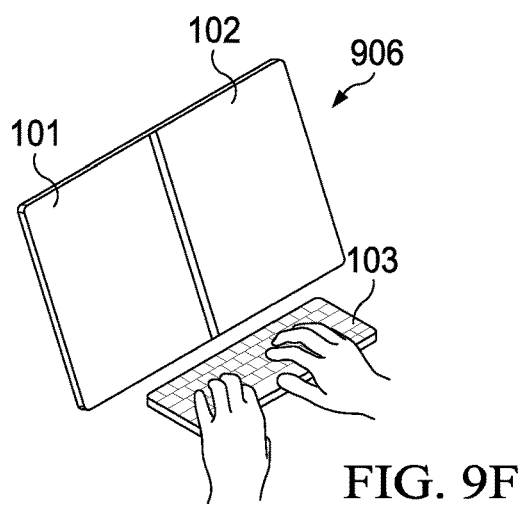

In FIG. 9E, the display posture of state 905 shows both displays 101 and 102 standing vertically or at display angle, and in FIG. 9F state 906 shows the same display posture but with keyboard 103 used off the bottom edge or long side of display 101.

It should be noted that the aforementioned postures, and their various respective keyboard states, are described for sake of illustration. In different embodiments, however, other postures and keyboard states may be used, for example, depending upon the type of hinge coupling the displays, the number of displays used, or other accessories. For instance, when IHS 100 is chargeable via a charging or docking station, the connector in the docking station may be configured to hold IHS 100 at angle selected to facility one of the foregoing postures (e.g., keyboard states 905 and 906).

FIGS. 10A-C illustrate a first example use-case of method 500 in the context of a laptop posture. In state 1000A of FIG. 10A, first display 101 shows primary display area 1001, keyboard 103 sits atop second display 102, and second display 102 provides UI features such as first ribbon area 1002 (positioned between the top long edge of keyboard 103 and hinge 104) and touch area 1003 (positioned below keyboard 103). As keyboard 103 moves up or down on the surface of display 102, ribbon area 1002 and/or touch area 1003 may dynamically move up or down, or become bigger or smaller, on second display 102. In some cases, when keyboard 103 is removed, a virtual OSK may be rendered (e.g., at that same location) on the display surface of display 102.

In state 1000B of FIG. 10B, in response to execution of method 500 by multi-form factor configuration engine 401, first display 101 continues to show main display area 1001, but keyboard 103 has been moved off of display 102. In response, second display 102 now shows secondary display area 1004 and also second ribbon area 1005. In some cases, second ribbon area 1005 may include the same UI features (e.g., icons, etc.) as also shown in area 1002, but here repositioned to a different location of display 102 nearest the long edge of keyboard 103. Alternatively, the content of second ribbon area 1005 may be different from the content of first ribbon area 1002.

In state 1000C of FIG. 10B, during execution of method 500 by multi-form factor configuration engine 401, IHS 100 detects that physical keyboard 103 has been removed (e.g., out of wireless range) or turned off (e.g., low battery), and in response display 102 produces a different secondary display area 1006 (e.g., smaller than 1004), as well as OSK 1007.

FIGS. 11A-C illustrate a second example use-case of method 500 in the context of a tablet posture. In state 1100A of FIG. 11A, second display 102 has its display surface facing up, and is disposed back-to-back with respect to second display 102, as in states 709/710, but with keyboard 103 sitting atop second display 102. In this state, display 102 provides UI features such primary display area 1101 and first ribbon area 1102, positioned as shown. As keyboard 103 is repositioned up or down on the surface of display 102, display area 1101, first ribbon area 1102, and/or touch area 1103 may also be moved up or down, or made bigger or smaller, by multi-form factor configuration engine 401.

In state 1100B of FIG. 11B, keyboard 103 is detected off of the surface of display 102. In response, first display 101 shows modified main display area 1103 and modified ribbon area 1104. In some cases, modified ribbon area 1104 may include the same UI features as area 1102, but here repositioned to a different location of display 102 nearest the long edge of keyboard 103. Alternatively, the content of second ribbon area 1104 may be different from the content of first ribbon area 1102. In some cases, the content and size of modified ribbon area 1104 may be selected in response to a distance between keyboard 103 and display 102.

In state 1100C of FIG. 11C, during continued execution of method 500, multi-form factor configuration engine 401 detects that physical keyboard 103 has been removed or turned off, and in response display 102 produces yet another display area 1105 (e.g., larger than 1003 or 1002), this time without an OSK.

In various embodiments, the different UI behaviors discussed in the aforementioned use-cases may be set, at least in part, by policy and/or profile, and stored in a preferences database for each user. In this manner, UI features and modifications of blocks 502 and 504, such as whether touch input area 1003 is produced in state 1000A (and/or its size and position on displays 101/102), or such as whether ribbon area 1102 is produced in state 1100A (and/or its size and position on displays 101/102), may be configurable by a user.

FIGS. 12A-D illustrate a 360-hinge implementation, usable as hinge 104 in IHS 100, in four different configurations 1200A-D, respectively. Particularly, 360-hinge 104 may include a plastic, acrylic, polyamide, polycarbonate, elastic, and/or rubber coupling, with one or more internal support, spring, and/or friction mechanisms that enable a user to rotate displays 101 and 102 relative to one another, around the axis of 360-hinge 104.

Hinge configuration 1200A of FIG. 12A may be referred to as a closed posture, where at least a portion of a first display surface of the first display 101 is disposed against at least a portion of a second display surface of the second display 102, such that the space between displays 101/102 accommodates keyboard 103. When display 101 is against display 102, stylus or accessory 108 may be slotted into keyboard 103. In some cases, stylus 108 may have a diameter larger than the height of keyboard 103, so that 360-hinge 104 wraps around a portion of the circumference of stylus 108 and therefore holds keyboard 103 in place between displays 101/102.

Hinge configuration 1200B of FIG. 12B shows a laptop posture between displays 101/102. In this case, 360-hinge 104 holds first display 101 up, at an obtuse angle with respect to first display 101. Meanwhile, hinge configuration 1200C of FIG. 12C shows a tablet, book, or display posture (depending upon the resting angle and/or movement of IHS 100), with 360-hinge 104 holding first and second displays 101/102 at a straight angle (180°) with respect to each other. And hinge configuration 1200D of FIG. 12D shows a tablet or book configuration, with 360-hinge 104 holding first and second displays 101 and 102 at a 360° angle, with their display surfaces in facing opposite directions.

Figure 13B:
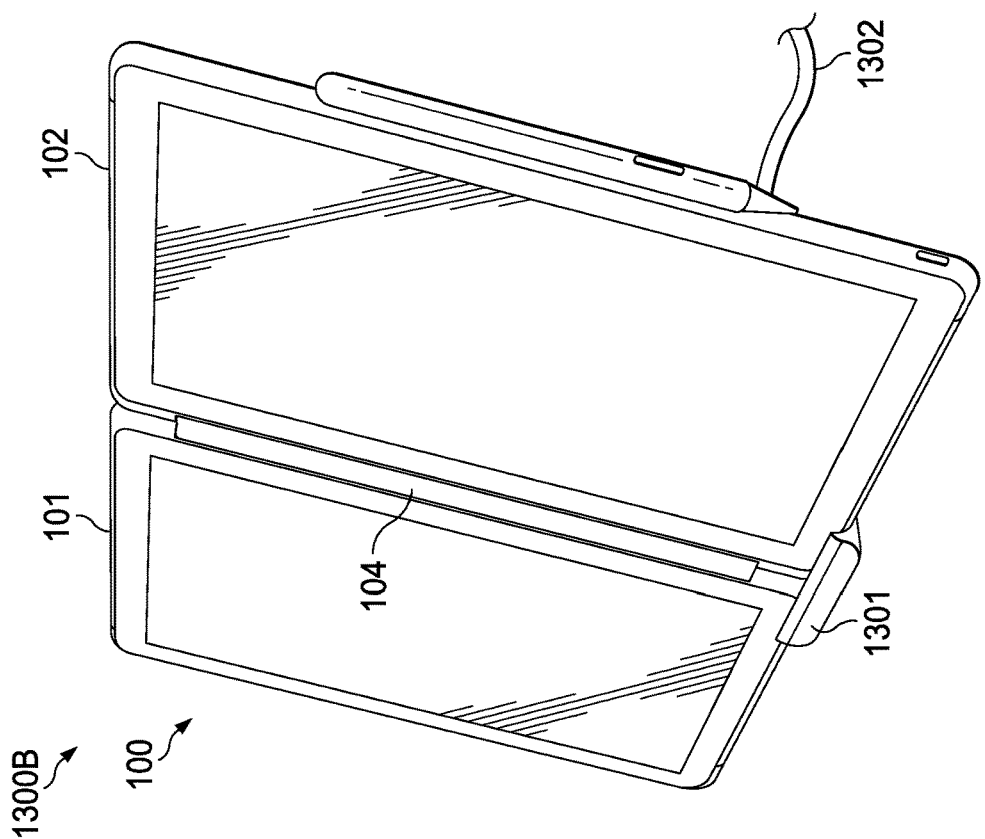
FIGS. 13A and 13B illustrate an example of a charger stand, according to some embodiments.
Figure 13A:
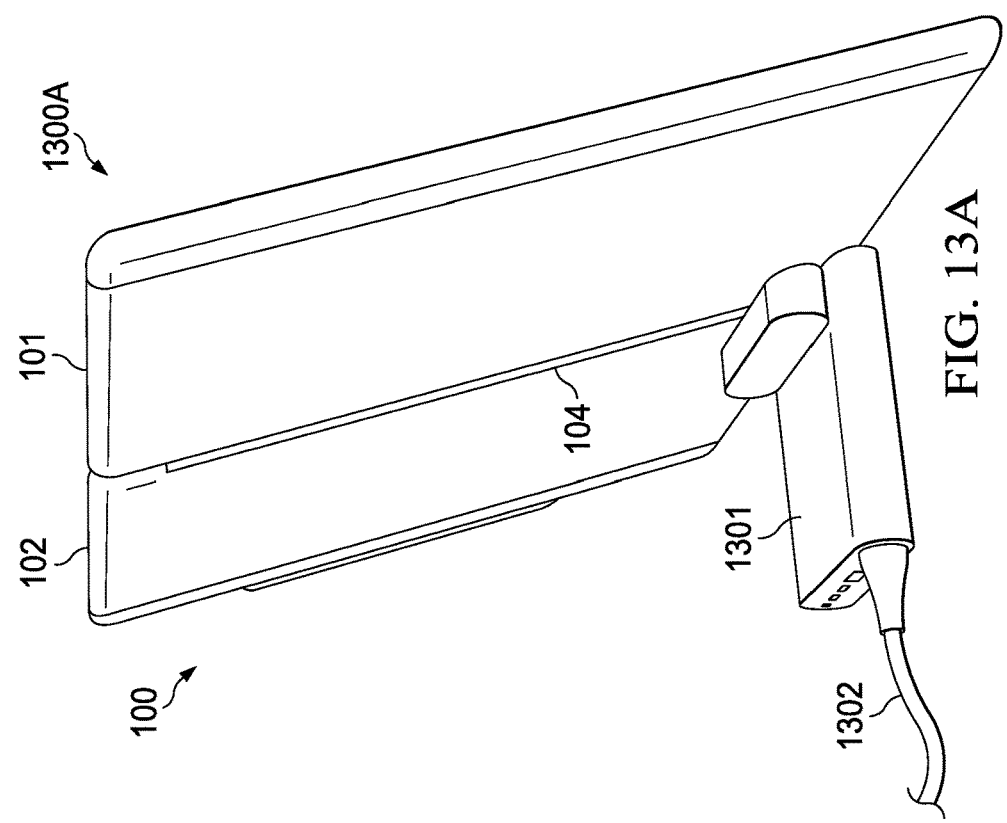

FIGS. 13A and 13B illustrate an example of charger stand 1301, alternatively referred to as a charger, a stand, a docking system, or a dock. Rear view 1300A of charger stand 1301 also depicts IHS 100 comprising first display 101 and second display 102 connected via hinge 104. While used in a multi-monitor or double portrait display mode, IHS 100 is supported by charger stand 1301 in an inclined position (with respect to the vertical axis). In many situations, charger stand 1301 may be coupled to an electrical power source (e.g., AC mains) via wire or cable 1302. Front view 1300B of charger stand 1301 shows the same configuration of view 1300A, but now seen from the front side of IHS 100.

In various embodiments, charger stand 1301 may be used in a closed configuration as a charger or AC adaptor (sometimes known as a power brick), but it can also be opened to support IHS 100 in the inclined position of views 1300A and 1300B. As described in more detail below, when charger stand 1301 is an open configuration, IHS 100 is placed in a tray that jumps out of the dock upon activation of a latch. In addition, a cap folds over onto the body of charger stand 1301 to create a larger (and taller) support surface for IHS 100 to lean against.

Figure 14B:
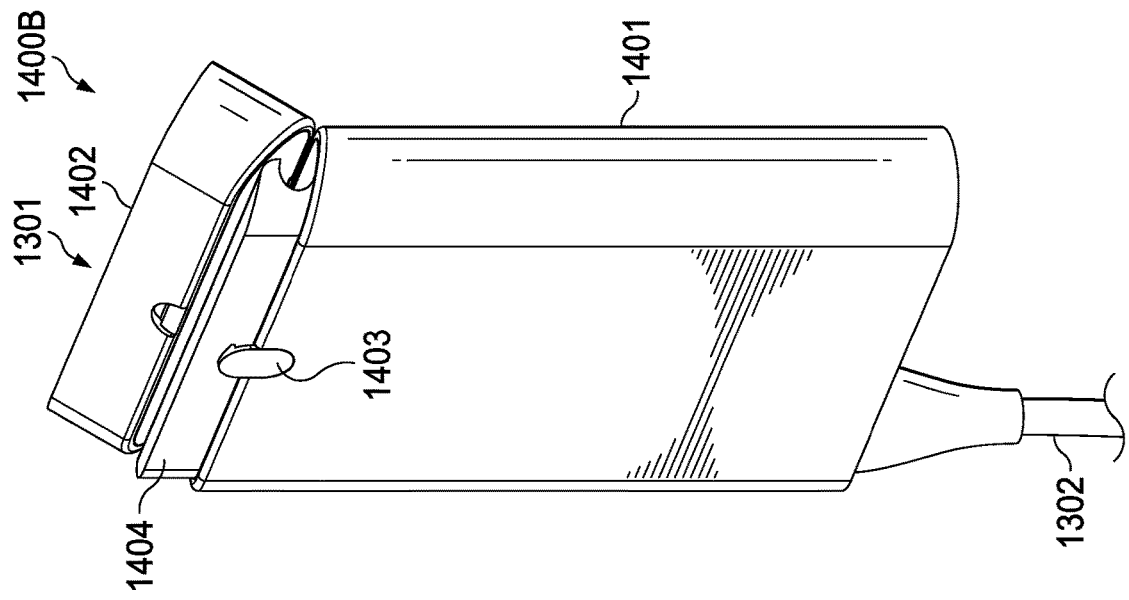
FIGS. 14A-E illustrate the operation of the charger stand, according to some embodiments.
Figure 14A:
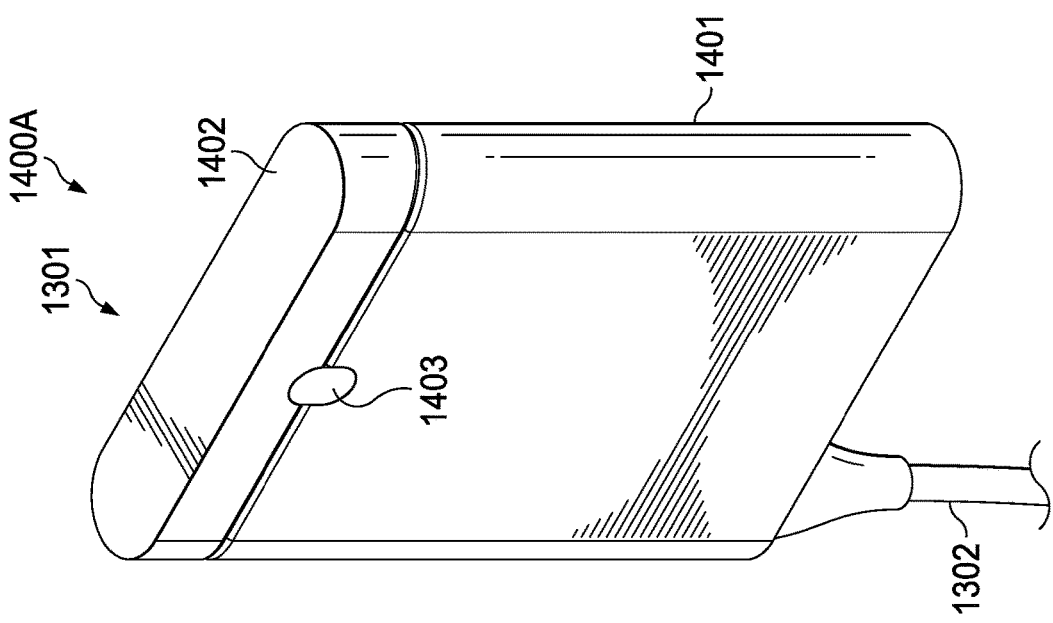
Figure 14C:
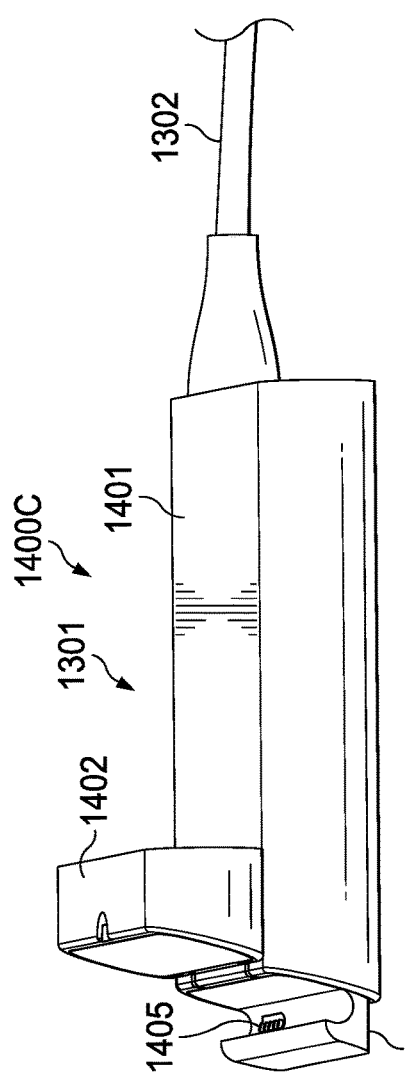
Figure 14D:
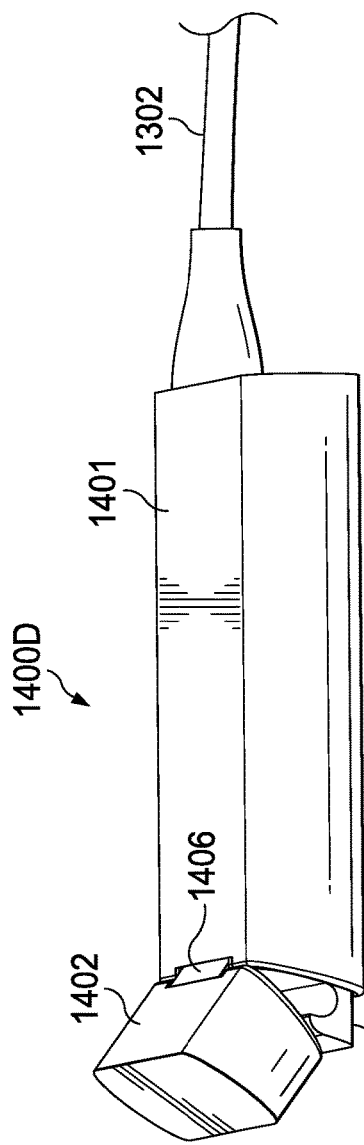
Figure 14E:
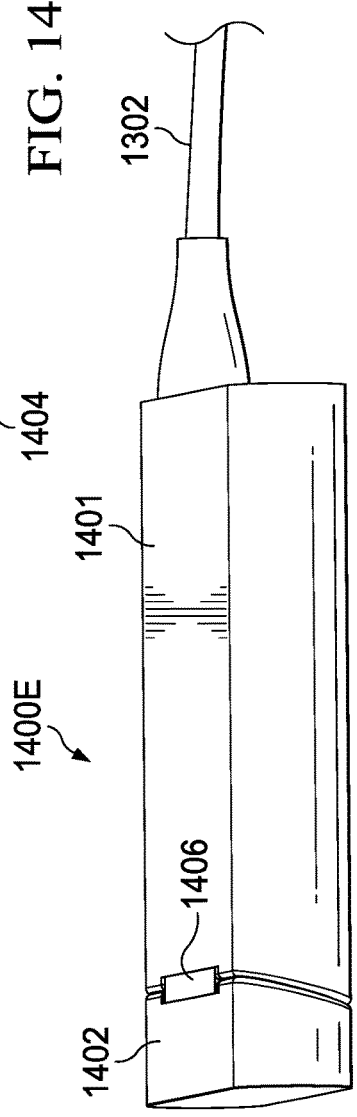

FIGS. 14A-E illustrate the operation of charger stand 1301. Particularly, FIGS. 14A-C illustrate an opening operation, and FIGS. 14C-E illustrate a closing operation. In configuration 1400A, body 1401 of charger stand 1301 and cap 1402 are initially held closed by latch 1403. As part of an opening operation, in configuration 1400B, latch 1403 is activated by a user (e.g., a finger press) and cap 1402 begins to fold over body 1401. Spring-loaded tray 1404 begins to eject from body 1401 and pushes cap 1402 out, causing it to rotate around body 1401.

Once tray 1404 is in its ejected position, as in configuration 1400C, cap 1402 is folded over body 1401 (here by 180°, compared to initial configuration 1400A). As a result, IHS 100 may be inserted in tray 1404 and supported, in an inclined position, by both tray 1404 and cap 1402. Because cap 1402 rests above body 1401, cap 1402 increases the area and the height of the support surface that would otherwise be provided by tray 1404 alone.

Moreover, inserting IHS 100 into tray 1404 may also couple it to electrical connector 1405 of charger stand 1301 for powering, charging, or other forms of communications (e.g., Powerline networking). For example, electrical connector 1405 may include a number of pogo pins, and a mating connector around the edge of IHS 100 (now shown) may include matching electrical terminals.

Once IHS 100 is removed from tray 1404 in configuration 1400C, charger stand 1301 may undergo a closing operation. In configuration 1400D, the user rotates cap 1402 around hinge 1406 back to its original position, thereby pushing spring-loaded tray 1404 inside body 1401. In configuration 1400E, cap 1402 is closed against body 1401 and held shut by operation of latch 1403, while tray 1404 has slid inside body 1401 to its closed position.

Figure 15:
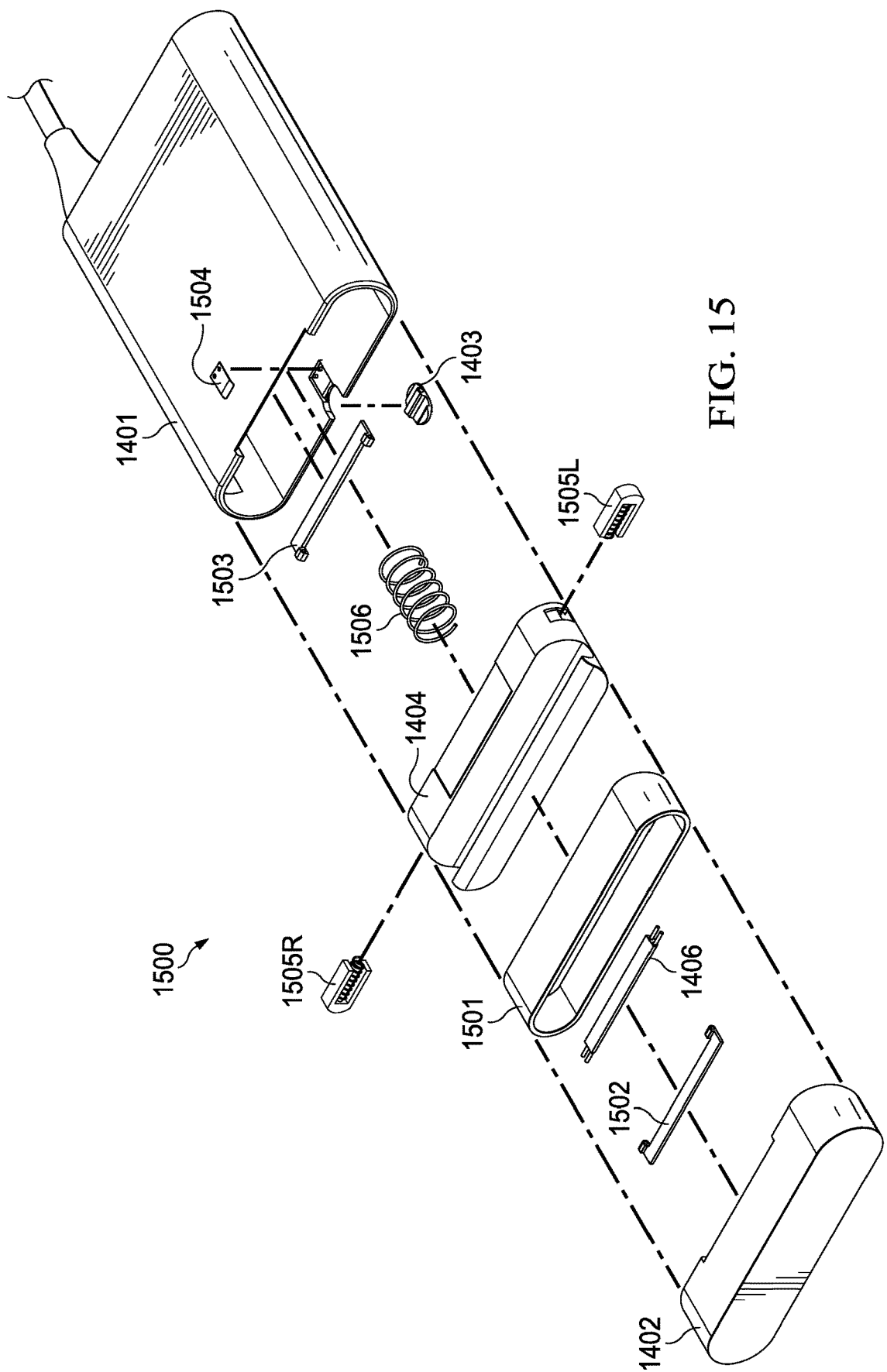
FIG. 15 illustrates an exploded view of components the charger stand, according to some embodiments.

FIG. 15 illustrates exploded view 1500 of components of charger stand 1301, according to some embodiments. From left to right, charger stand 1301 includes: cap 1402, first hinge plate 1502, cap core 1501, hinge 1406, tray 1404, left stopper 1505L and right stopper 1505R, tray spring 1506, latch 1403, leaf spring 1504, second hinge plate 1503, and body 1401.

When assembled, cap core 1501 may be a plastic core inserted into cap 1402. First hinge plate 1502 may be glued to cap 1402 and/or core 1501, and second hinge plate 1503 may be glued to body 1401. Hinge 1404 may be a dual-axis hinge (e.g., with two with watchband-type spring bar pins or the like) that fit into hinge plates 1502 and 1503, thus rotatably coupling cap 1402 to body 1401. Stoppers 1505 may include spring-loaded stoppers inserted onto the sides of tray 1404 and slideable within internal rails of body 1401 to restrict the translation of tray 1401, as it travels in and out of body 1401 under the outwardly pushing action of tray spring 1506. In some cases, leaf spring 1504 may be heat staked to body 1401.

Figure 16:
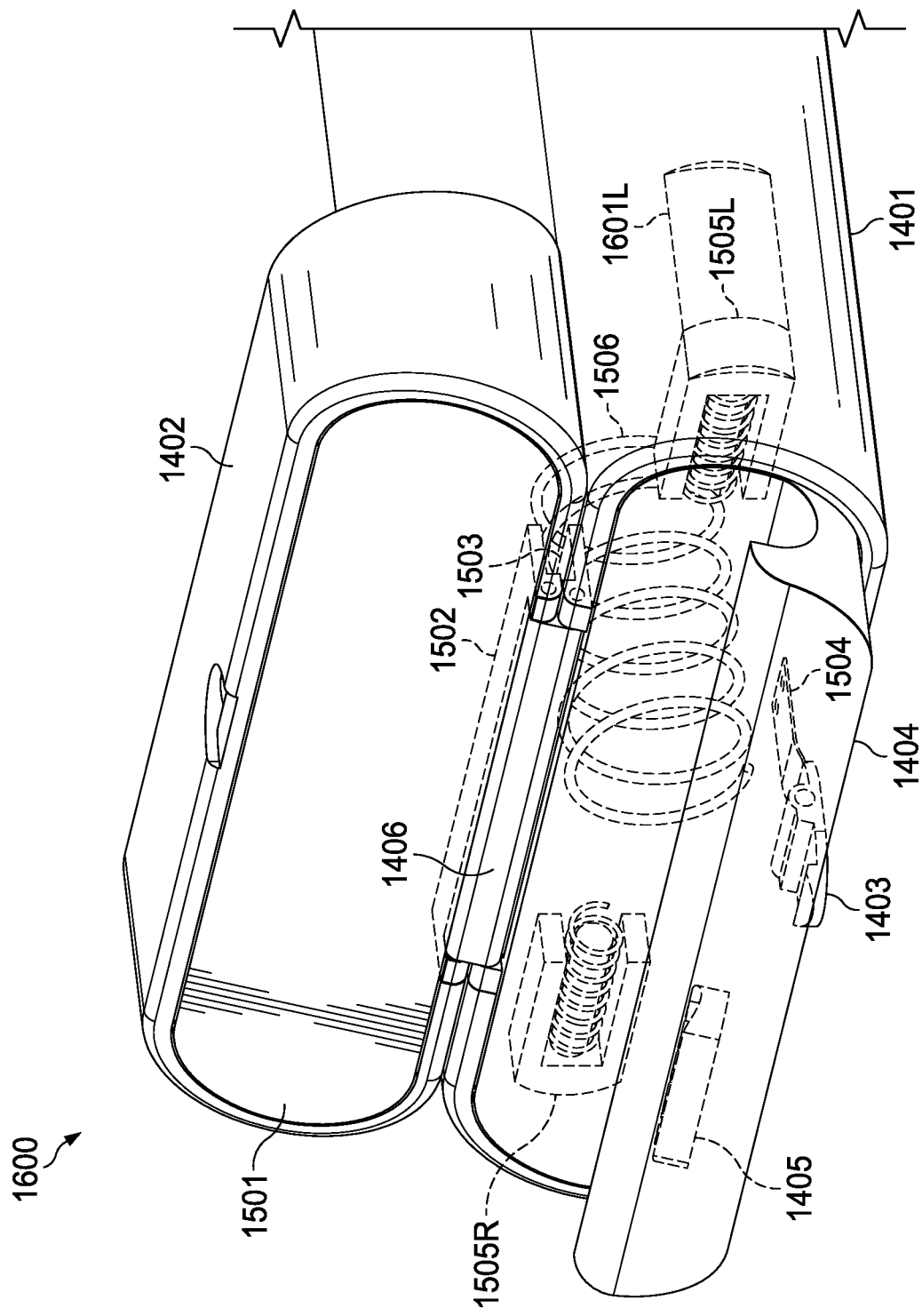
FIG. 16 illustrates a see-through view of the assembled charger stand, according to some embodiments.

FIG. 16 illustrates see-through view 1600 of assembled charger stand 1301 in its open configuration. Internal rail 1601L is where spring-loaded stopper 1505L rides. Another corresponding internal rail 1601R is provided for right spring-loaded stopper 1505R. Other components shown in view 1600 include cap 1402, cap core 1501, hinge plates 1502 and 1503, hinge 1406, electrical connector 1405, latch 1403, and leaf spring 1504.

Internal rails 1601 enable spring-loaded stoppers 1505 to restrict the translation of tray 1404 with respect to body 1401, particularly as tray 1404 slides in and/or out of body 1401. In some cases, the length and position of rails 1601 may be designed to prevent tray 1404 from ejecting entirely out of body 1401 when charger stand 1301 is placed an open configuration, and/or from damaging other internal parts (e.g., AC adaptor or converter circuitry) when charger stand 1301 is returned to a closed configuration.

Figure 17A:
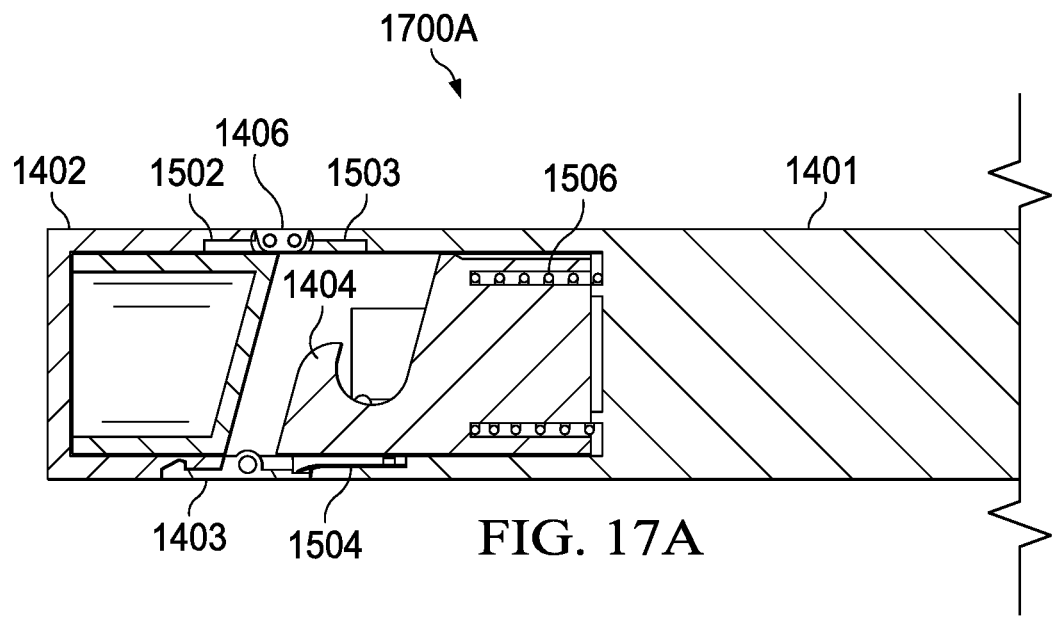
FIGS. 17A and 17B illustrate the charger stand in open and closed configurations to show effects on the support surface, according to some embodiments.
Figure 17B:
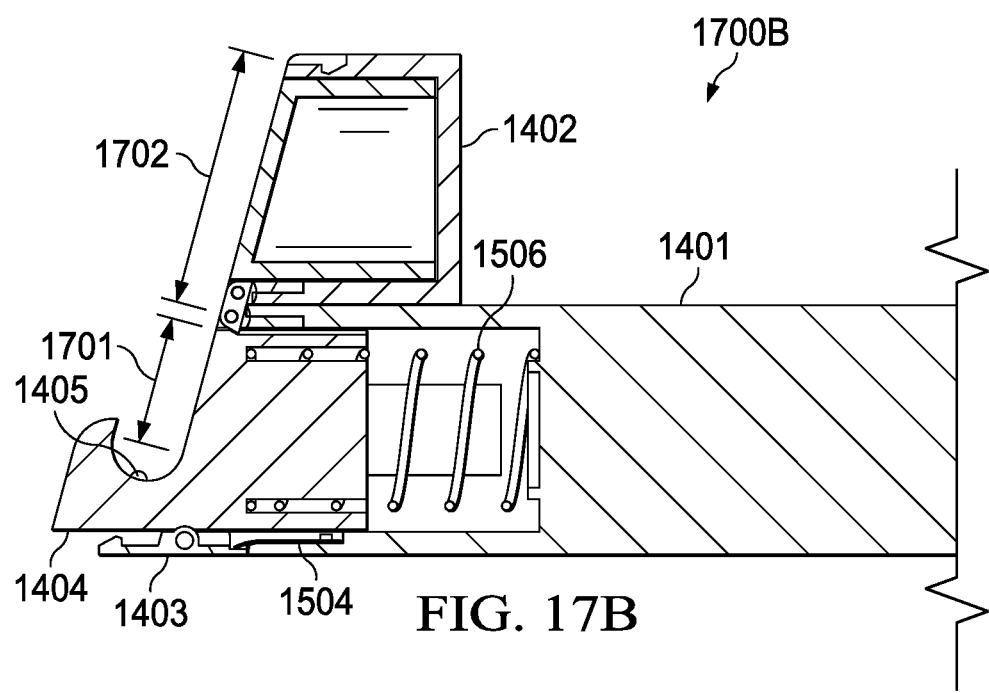

FIGS. 17A and 17B illustrate charger stand 1301 in closed and open configurations 1700A and 1700B, respectively, to show effects on the support surface of tray 1404. In closed configuration 1700A, cap 1402 holds tray 1404 inside body 1401 against action from tray spring 1506, held together by latch 1403 and leaf spring 1504. In this position hinge 1406 is at straight angle with respect to plates 1502 and 1503, and parallel with respect to the surface of body 1401.

In open configuration 1700B, cap 1402 is folded against body 1401 by 180°, and tray 1404 is out of body 1401 under pressure from spring 1506, as restricted by the operation of stoppers 1505 against rails 1601. In this position, the leaning surface 1701 provided by tray 1404 is augmented by another leaning surface 1702 provided by cap 1402. Together, the two leaning surfaces 1701 and 1702 create a larger and taller support surface against which IHS 100 can rest or lean, for example, when placed in dual-portrait display posture. In various implementations, when charger stand 1301 is in configuration 1700B, cap surface 1702 may approximately double the area and height of tray surface 1701.

Figure 18A:
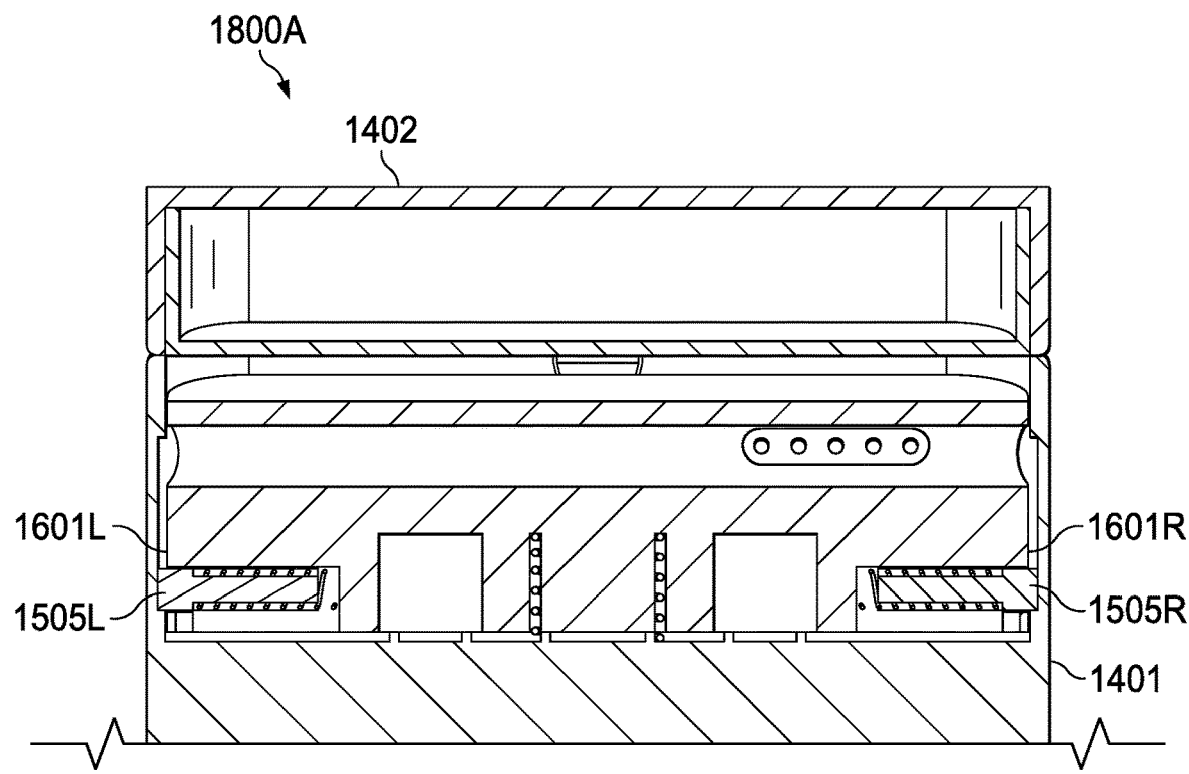
FIGS. 18A and 18B illustrate the charger stand in open and closed configurations to show the operation of tray stoppers, according to some embodiments.
Figure 18B:
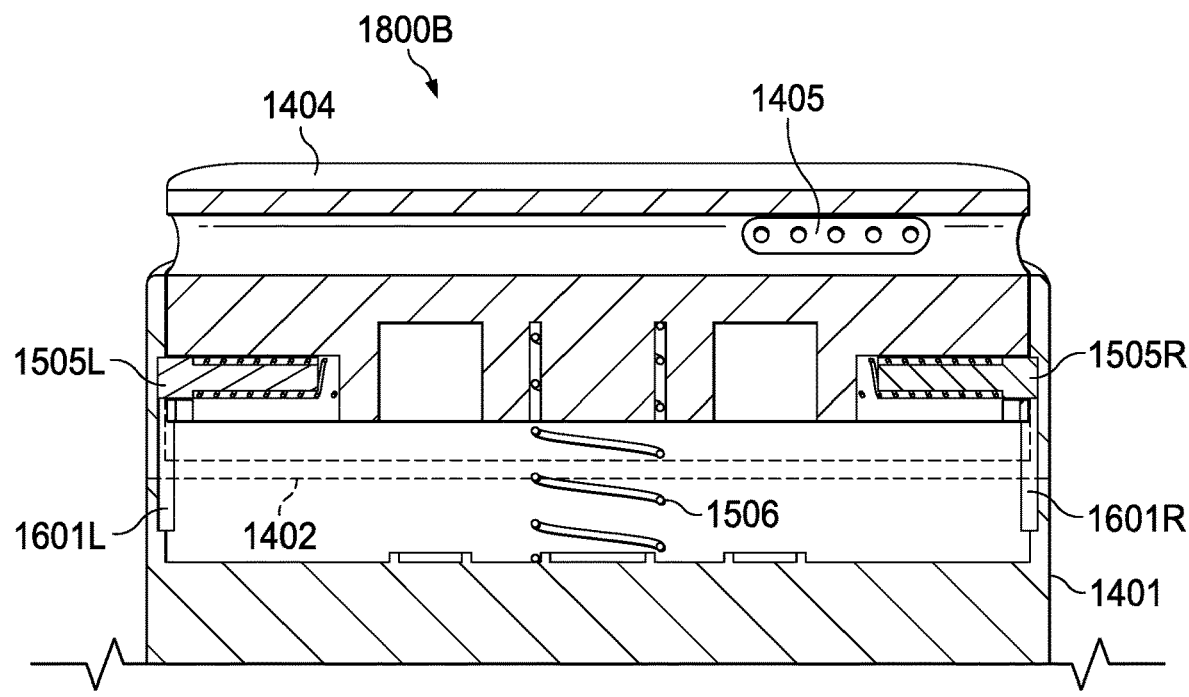

FIGS. 18A and 18B illustrate charger stand 1301 in closed configuration 1800A and open configuration 1800B, to show the operation of tray stoppers 1505. In closed configuration 1800A, cap 1402 holds tray 1404 inside body 1401, such that left spring-loaded tray stopper 1505L is in a first, lower end of left-side rail 1601L, and right spring-loaded tray stopper 1505R is in a corresponding end of right-side rail 1601R.

In open configuration 1800B, tray 1404 is outside of body 1401 with cap 1402 open and rotated. Here, left spring-loaded tray stopper 1505L is in a second, upper end of left-side rail 1601L, and right spring-loaded tray stopper 1505R is in a corresponding end of right-side rail 1601R. The length and position of rails 1601 within body 1401 control the travel distance or translation of tray 1404 in and out of body 1401 between the open and closed configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A dock, comprising:
a body;
a tray insertable into the body, wherein the tray provides a first portion of a leaning surface configured to support a display of an Information Handling System (IHS) in an inclined position; and
a cap coupled to the body, wherein when the dock is in a closed position, the cap holds the tray inside the body, and wherein when the dock is open, the cap folds onto the body to provide a second portion of the leaning surface and increases the leaning surface.

2. The dock of claim 1, wherein the tray is insertable into the body against a tray spring configured to push the tray outward.

3. The dock of claim 2, wherein the tray is coupled to the body via a pair of spring-loaded stoppers configured to slide within rails disposed on the internal surface of the body.

4. The dock of claim 2, wherein the cap is coupled to the body via a dual-axis hinge.

5. The dock of claim 2, further comprising a latch coupling the cap to the body, wherein the latch is usable to open and close the dock.

6. The dock of claim 5, wherein the latch is coupled to a leaf spring configured to maintain the cap closed against the body, while resisting action of the tray spring upon the tray when the dock is a closed position.

7. The dock of claim 1, wherein the cap approximately doubles the leaning surface area when folded onto the body.

8. The dock of claim 1, further comprising an electrical connector coupled to the tray, wherein the IHS is coupled to the electrical connector when the display is supported by the leaning surface.

9. The dock of claim 8, further comprising a power supply disposed within the body and coupled to the electrical connector, wherein the power supply is configured to at least one of: power the IHS; or charge a battery of the IHS.

10. A method, comprising:
- activating a latch of a dock, wherein the dock comprises: (i) a body, (ii) a tray, and (iii) a cap, wherein activating the latch causes the cap to fold over the body, and wherein prior to activation, the latch is configured to maintain the cap closed against the body under action of a leaf spring coupled to the body; and
- placing an Information Handling System (IHS) in the tray against the folded cap.

11. The method of claim 10, wherein the folded cap increases a leaning surface of the tray.

12. The method of claim 10, wherein the cap is coupled to the body via a hinge disposed on a side of the body opposite the latch.

13. The method of claim 10, wherein placing the IHS in the tray comprises coupling the IHS to an electrical connector on the tray, and wherein the method further comprises powering or charging the IHS via the electrical connector.

14. The method of claim 10, further comprising:
- removing the IHS from the tray;
- rotating the cap around the hinge to insert the tray into the body; and
- engaging the latch against the leaf spring.

15. An Information Handling System (IHS), comprising:
- a processor; and
- a memory coupled to the processor, the memory having program instructions that, upon execution by the processor, cause the IHS to:
  - detect a connection of the IHS to a dock configured to hold at least one display up against a support surface; and
  - power or charge the IHS via the connection, wherein the dock comprises: (i) a body, (ii) a tray that provides a first portion of the support surface, (iii) a cap folded over the body that provides a second portion of the support surface, and (iv) a latch coupling the cap to the body, wherein the latch is usable to open and close the dock and is coupled to a leaf spring configured to maintain the cap closed against the body, while resisting action of the tray spring upon the tray when the dock is closed.

16. The IHS of claim 15, wherein the cap is coupled to the body via a dual-axis hinge.

* * * * *